(12) United States Patent
Bendich et al.

(10) Patent No.: US 7,167,915 B2
(45) Date of Patent: Jan. 23, 2007

(54) MONITORING STORAGE RESOURCES USED BY COMPUTER APPLICATIONS DISTRIBUTED ACROSS A NETWORK

(75) Inventors: Justin Bendich, Wheaton, IL (US); Steven M. Corrigan, Lombard, IL (US); Stephen C. Donovan, Glen Ellyn, IL (US); Edward M. McCrickard, Winfield, IL (US); W. Scott McCullough, Wheaton, IL (US)

(73) Assignee: International Business Machines Corporation, Armonk, NY (US)

(*) Notice: Subject to any disclaimer, the term of this patent is extended or adjusted under 35 U.S.C. 154(b) by 831 days.

(21) Appl. No.: 10/273,583

(22) Filed: Oct. 18, 2002

(65) Prior Publication Data

US 2004/0078461 A1    Apr. 22, 2004

(51) Int. Cl.
    *G06F 15/173* (2006.01)
(52) U.S. Cl. ............... 709/224; 709/223; 709/226; 718/104; 707/3; 707/10

(58) Field of Classification Search ............... 709/224, 709/223, 226, 229, 203; 718/104; 707/3, 707/10; 711/100
See application file for complete search history.

(56) References Cited

U.S. PATENT DOCUMENTS

| | | | | |
|---|---|---|---|---|
| 6,945,458 | B1* | 9/2005 | Shah et al. | 235/385 |
| 2002/0198985 | A1* | 12/2002 | Fraenkel et al. | 709/224 |
| 2005/0086646 | A1* | 4/2005 | Zahavi et al. | 717/131 |

\* cited by examiner

*Primary Examiner*—Frantz B. Jean
(74) *Attorney, Agent, or Firm*—Kunzler & Associates

(57) ABSTRACT

Computing devices storing and executing applications across a network each include agent software to communicate with the application at the computing device to retrieve storage utilization information. At a server on the network, data representative of storage utilization by the applications executing at the several computing devices across the network is collected from the agents for processing.

19 Claims, 27 Drawing Sheets

MONITORING STORAGE RESOURCES USED BY COMPUTER APPLICATIONS DISTRIBUTED ACROSS A NETWORK

FIELD OF THE INVENTION

The present invention relates generally to monitoring of computer storage resources, and more particularly to monitoring of resources by computer applications distributed across a network.

BACKGROUND OF THE INVENTION

System administrators have been managing the scarce resources of their computer systems in order to meet performance and capacity objectives using a variety of techniques. As mission critical applications grow increasingly data intensive, organizations have placed more and more emphasis on resource management.

Tools exist to help administrators understand resource utilization. Typically these tools address consumption of common resources such as processor utilization or storage utilization. Storage utilization is typically reported from a hardware perspective, for example as the percentage of a storage volume or device being used detailed perhaps by user or application.

In cases where the application, such as a database, manages its own information, little information is usually available to help the administrator understand how the large block of storage allocated to the application is being used. Typically, the file system allocates a block of storage to the application to manage and then no longer has knowledge of how that block is used. As such, little or no information relating the structure of the database to the physical aspects of the file system on which the database relies is available.

To further complicate matters, an administrator often needs to gather information from a number of systems and tally the results to understand global resource utilization. Such systems may be in a single location but are typically spread out across a wide geographic area, connected by a network.

It would therefore be highly desirable to have a method and software providing detailed information of resources used by applications across a network.

SUMMARY OF THE INVENTION

Exemplary of the present invention, computing devices storing and executing applications across a network include agent software to communicate with the application at the computing device to retrieve storage utilization information. At a server on the network, data representative of storage utilizations by the applications executing at the several computing devices across the network is collected from the agents for processing.

Conveniently, software exemplary of the present invention allows collection of specific information associated with an application, such as the logical relationships between application entities such as databases, tables, log files, indexes and the physical storage allocations associated with those entities as well as total storage used by each user.

Advantageously, the methods exemplary of the invention may be employed across a variety of applications, allowing collected information to be stored, aggregated, and accumulated thus presenting a more complete view of utilization and consumption and associated trends.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures, which illustrate embodiments of the present invention by example only.

Like reference numerals refer to corresponding components and steps throughout the drawings.

DETAILED DESCRIPTION

Figure 1:
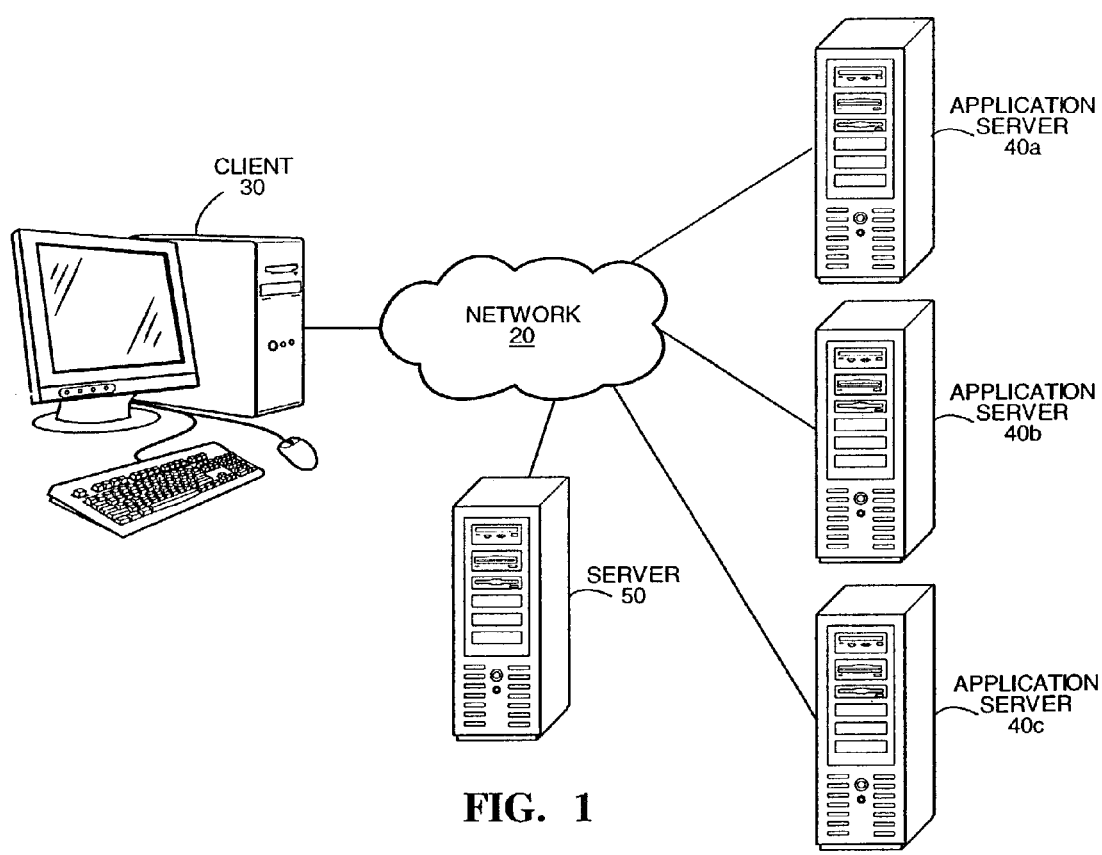
FIG. 1 is a hardware overview of a network including a collection server for collecting resource utilization, several monitored computing devices, and a client computing device, exemplary of embodiments of the present invention.

FIG. 1 illustrates an exemplary data communications network 20, interconnected with an data collection server 50, in communication with a plurality of computing devices 40a, 40b and 40c (individually and collectively devices 40), exemplary of embodiments of the present invention. A client computing device 30 in communication with network 20 to establish communication with server 50 is also illustrated.

Computing devices 40, client computing device 30 and data collection server 50 are all conventional computing devices, each including a processor and computer readable memory storing an operating system and software applications and components for execution.

Data communications network 20 may be, for example a conventional local area network that adheres to suitable network protocol such as the Ethernet, token ring or similar protocols. Alternatively, the network protocol may be compliant with higher level protocols such as the Internet protocol (IP), Appletalk, or IPX protocols. Similarly, network 20 may be a wide area network, or the public internet.

Client computing device 30 is a network aware computing device, providing an end-user interface that allows an end-user to exchange and view information stored at server 50.

Computing devices 40 are computing devices storing and executing data processing, data storage or similar applications. Often such computing devices are referred to as application servers. For simplicity only three computing devices 40 are illustrated. As will become apparent, applications at each device 40 store data for their own use and processing, typically on computer storage memory at device 40.

Server 50 collects storage resource utilization information from computing devices 40, by way of agent software stored and executing at computing devices 40. Collected information is stored at server 50 for viewing and analysis, for example by way of client computing device 30.

Figure 2:
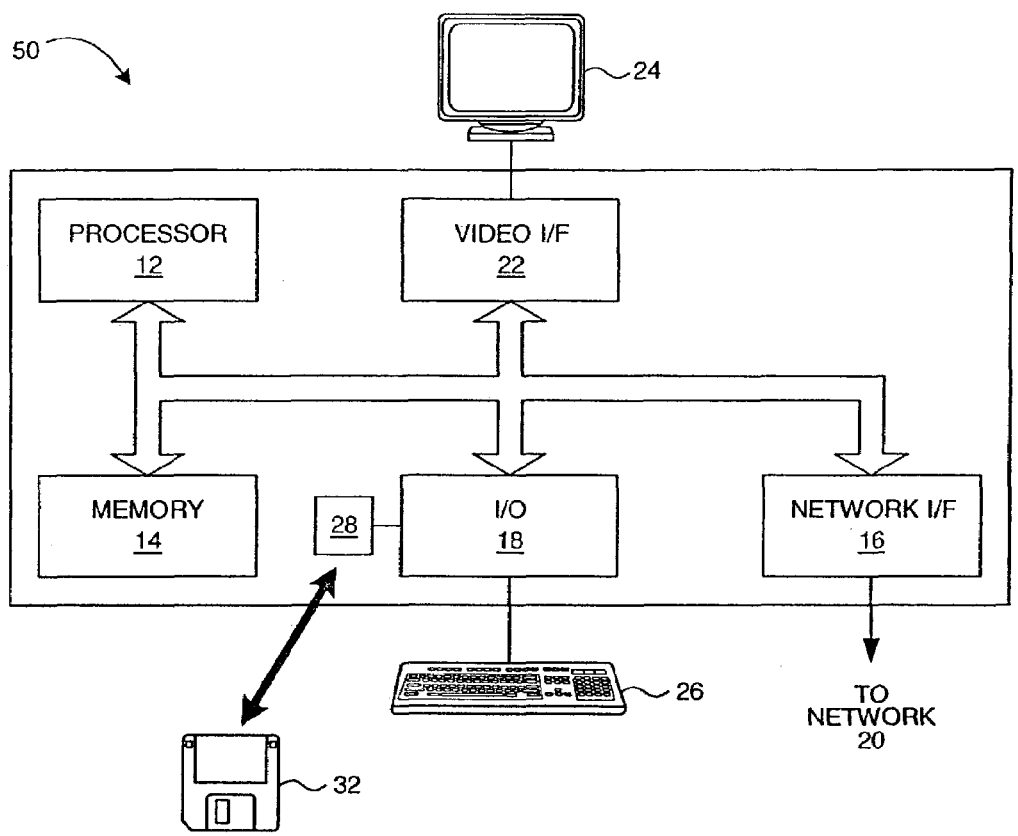
FIG. 2 illustrates an exemplary hardware architecture of a server of FIG. 1.

A simplified preferred hardware architecture of an example computing device 50 is schematically illustrated in FIG. 2. In the illustrated embodiment, device 50 is a conventional network capable server. Device 50 could, for example, be an Intel x86 based computer acting as a Microsoft Windows NT, Apple, or Unix based server, workstation, personal computer or the like. Example device 50 includes a processor 12, in communication with computer storage memory 14; network interface 16; input output interface 18; and video adapter 22. As well, device 50 may optionally include a display 24 interconnected with adapter 22; input/output devices, such as a keyboard 26 and disk drive 28 and a mouse (not shown) or the like. Processor 12 is typically a conventional central processing unit, and may for example be a microprocessor in the INTEL x86 family. Of course, processor 12 could be any other suitable processor known to those skilled in the art. Computer storage memory 14 includes a suitable combination of random access memory, read-only-memory, and disk storage memory used by device 12 to store and execute software programs adapting device 12 to function in manners exemplary of the present invention. Drive 28 is capable of reading and writing data to or from a computer readable medium 32 used to store software and data to be loaded into memory 14. Computer readable medium 32 may be a CD-ROM, diskette, tape, ROM-Cartridge or the like. Network interface 26 is any interface suitable to physically link device 10 to network 16. Interface 26 may, for example, be an Ethernet, ATM, ISDN interface or modem that may be used to pass data from and to network 20 or another suitable communications network.

The hardware architectures of computing devices 40 and client computing device 30 are materially similar to that of server 50, and will therefore not be further detailed.

Figure 3:
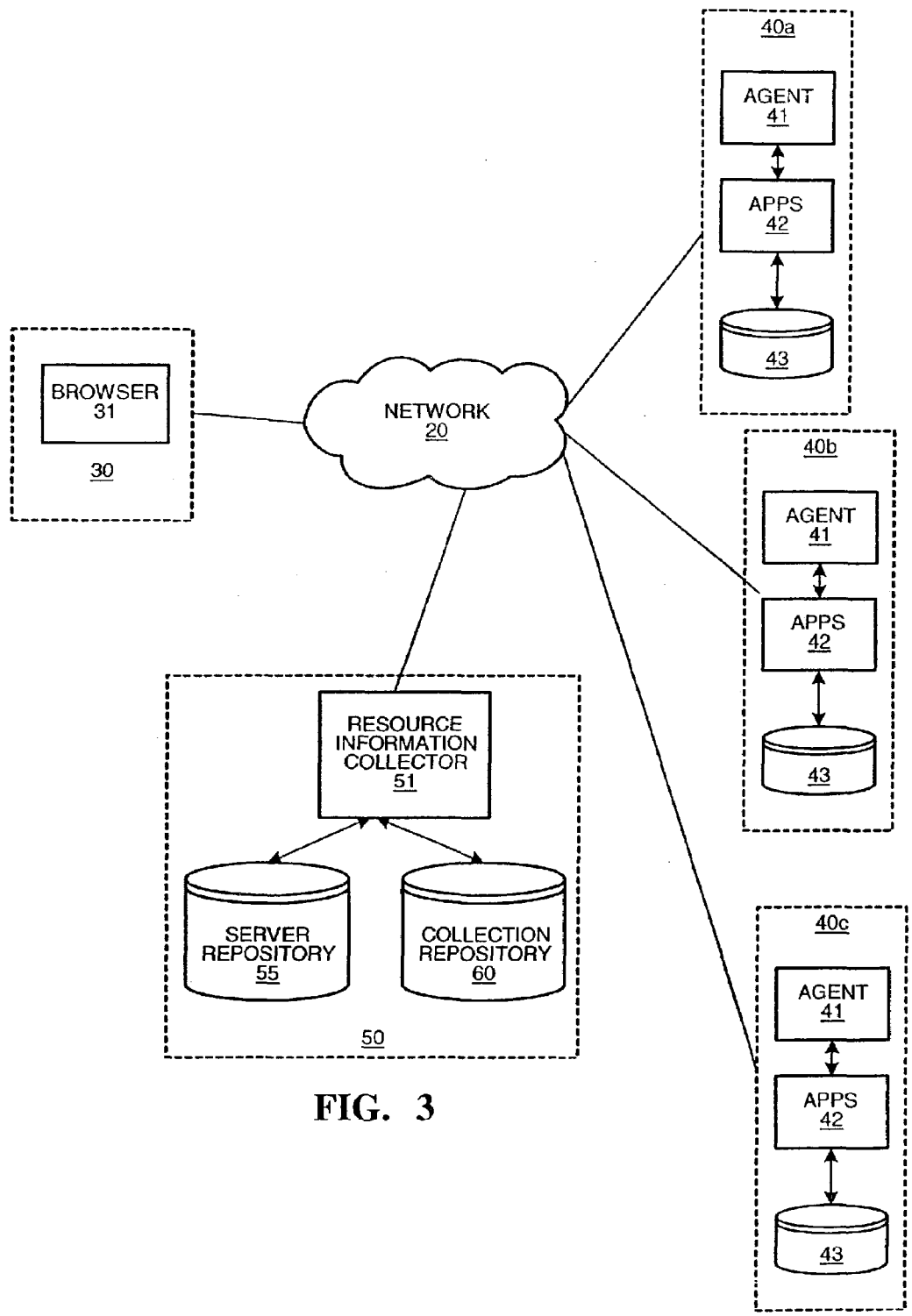
FIG. 3 illustrates software and data stored on the network of FIG. 1.

FIG. 3 schematically illustrates exemplary software and data stored at the computing devices illustrated in FIG. 1.

Software stored at client computing device 30 typically includes a protocol stack (not illustrated) that allows communication over network 20, and browser software 31 used as a graphical user interface to display and access information stored at server 50. The protocol stack may for example be an Internet Protocol stack, enabling communication with server 50 using conventional internet protocols. In the preferred embodiment, the graphical user interface is presented as a Java applet. It could, of course be presented using a mark-up language such as HTML or the like. As such, browser software 31 is preferably a conventional HTTP capable browser, stored for execution at client computing device 30. Browser software 31 may, for example, be Microsoft Internet Explorer, Netscape or Opera browser software. As will become apparent an HTTP server providing suitable screen definition data, in the form of Java code, HTML or the like, to browser 31. The HTTP server may be a part of or a separate entity from server 50. Of course, browser software 31 could be replaced with client specific software capable of presenting a graphical user interface, and optionally capable of displaying an interface as requested by server 50.

Server 50 of FIG. 1 includes resource information collection software 51, a data collection repository 60 and an operating repository 55. As will become apparent, collection software 51 collects data for storage within data repository 60, from applications executing at computing devices 40. Operating repository 55 stores configuration data, software, and the like for use in such collection. Such configuration data may take the form of specifications indicating what particular data elements are to be obtained from which particular applications; the frequency and interval of data collection; data defining when alerts should be presented; and the format of reports that may be produced from stored data within data collection repository 60. Data collection repository 60 may be any suitable storage file, including flat file or database. A database is preferable to allow for easier accumulation, dissemination and maintenance. Collection software 51 accordingly includes required software portions for storage and updating of data within repository 60. In the preferred embodiment, collection software 51 includes a database engine used to access data repository 60. Data collection repository 60 and server repository 55 have been illustrated as logically separate. They could, of course, be a combined in a single repository.

As noted, each computing device 40 may be considered an application server. As such, each computing device executes at least one software application 42 of interest. Each software application 42 of interest stores data within storage memory at its computing device 40. That is, each application 42 uses storage resources 43, typically in the form of one or more files stored on the file system on a persistent storage medium such as a hard disk drive, tape drive, optical storage unit or the like. Software application 42 may be a database application, an application that utilizes a database, or any other application that consumes storage resources at device 40. Application 42, may for example, be a database engine such as an ORACLE Database engine; a Microsoft SQL engine; a Pervasive database engine; or IBM DB2 database engine; or the like. Application 42 may alternatively be a personal information manager; an e-mail client, such as Lotus Notes, Microsoft Outlook, Eudora; or any other application making use of storage resources at device 40.

Agent 41 is a locally stored software application that interacts with application 42 to collect information indicative of utilization of storage resources 43. As such, agent 41 is configured to specifically co-operate with application 42. Different applications will require differently configured agents. A single agent 41 may be configured to interact with multiple applications at device 40. Agent 41 responds to requests from server 50 to obtain specific information known to application 42 about storage resource 43. Agent 41 accomplishes this by communicating with target application 42, requesting specific information be provided. Application 42 manages its data and in doing so is aware of application specific information. Application 42 responds to agent 41 by providing information of interest as requested. As will become apparent, use of exemplary agents 42 allows an operator in communication with server 50 to carefully monitor storage resource usage across network 20. So for example, in the event any application 42 at any monitored computing device 40 uses larger than expected resources, information collected at server 50 may be used to report, alert, and potentially debug unexpected resource usage.

As noted, agent 41 at each computing device 40 is matched to a corresponding application 42. That is, the structure, nature and function of an agent 41 depends on the type of application software 42 it is in communication with.

An agent 41 may be created using any number of software languages and development kits. In a preferred embodiment, each agent 41 is created using the Java programming language. A suitable agent 41 may be retrofitted (i.e. installed) at each machine that hosts an application whose storage usage is to be monitored. In this way, on any particular network 20, resource utilization of multiple different applications and application types may be monitored. As resource consuming applications are added to computing devices 40 on network 20 corresponding agents may be added to the computing devices 40.

Figure 4:
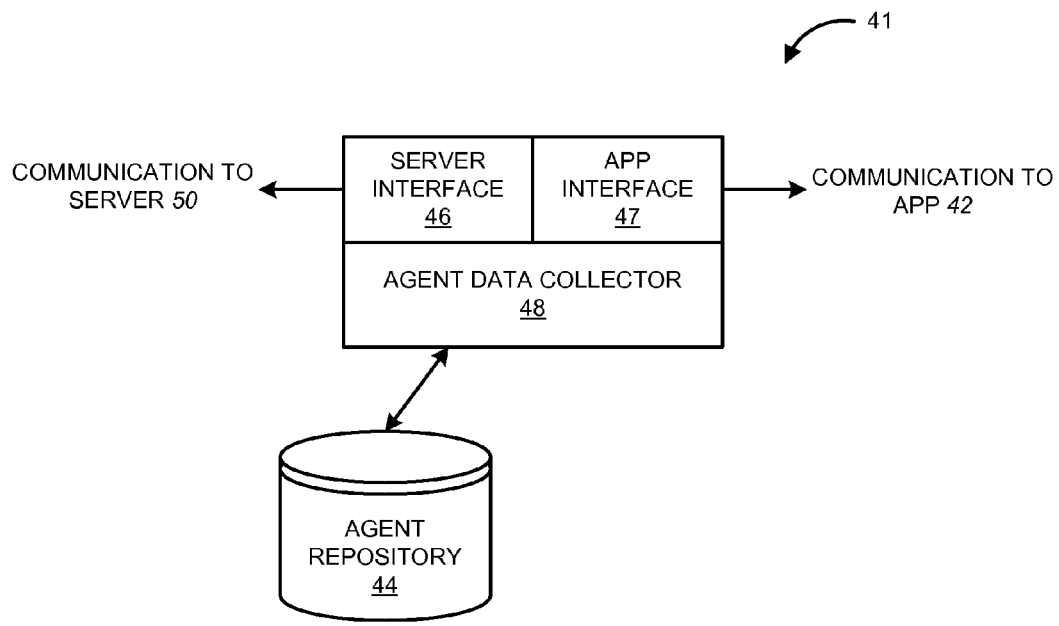
FIG. 4 illustrates agent resource utilization data collection software used on the network of FIG. 1, exemplary of an embodiment of the invention.

Exemplary functional components of agent 41 of FIG. 3 are further detailed in FIG. 4. As illustrated, example agent 41 includes server interface 46, agent data collector 48 and application interface 47. An agent data repository 44 is also illustrated. Application interface 47 provides commands to, or otherwise interfaces with, an associated application 42 in order to collect data from application 42 to provide to data collector 48.

Application interface 47 may, for example, use an application programming interface (API) to communicate with application 42, or may use some other mechanism. For example, depending on the nature of application 42, application interface 47 may communicate with the application through a pipe (in the case of certain UNIX based application), or through a query interface provided by the application. For relational databases, application interface 47 may communicate with the database engine application using standard structured query language (SQL) queries. Of course, application interface 47 may communicate with application 42 using varied mechanisms, depending on the desired information. The exact nature of application interface 47 is largely dependent on the nature of associated application 42 and the type of storage resource data that agent 41 collects from the application 42. Agent 41 does not normally access data managed by application 42 directly, but could be suitably modified to do. Application interface 47 may optionally cause execution of scripts or similar program files stored, of example in agent repository 44, and provided by server 50.

Server interface 46 allows server 50 and computing device 40 to communicate over network 20 to initiate data collection queries; to obtain status information; to exchange data; and optionally to provide software updates to agent 41. Server application 51 initiates data collection by agent 41 and agent 41 returns data collected from application 42 to server 50 using interface 46. A preferred protocol for this communication is TCP/IP but other well known public or private protocols may be used as well. Conveniently, server interface 46 of each agent 41 provides a uniform interface to collection software 51 by way of network 20.

Agent data repository 44, associated with agent 41, is used to store software updates from server 50 destined for agent 41; temporary files for use by agent 41, such as data collection results for transmission to server 50; and configuration information related to agent 41. Agent data repository 44 is typically stored on a filesystem of computing device 40. Storage of data at repository 44 may allow assembly of query data for collective transmission to server 50, and to increase probability of successfully transmitting query results to server 50. In the event of transmission or agent failure while transmitting query results, the output is not lost and the entire job will therefore not have to be rescheduled. Agent 41 has the ability to restart partially completed jobs as well as resend partially transmitted data files. This is of particular value for time intensive data collection by agent 41.

Agent data collector 48 includes normal housekeeping operational support for agent 41. Data collector 48 thus reads configuration files; manages performance of queries through application interface 47; manages temporary files and job log files; and installs software updates on agent 41.

Agent 41 may run as a background process at computing device 40 and collect data from application 42 by submitting information requests (in the form of SQL queries) for execution by application 42, or by communication with the application's API.

For typical applications 42, an associated agent 41 perform two types of queries to collect data about resource utilization of an application 42. A first general query collects resource usage oversight information (hereinafter referred to as a "probe"); a second performs a parametric resource utilization query that provides specific desired information about resources used by the application (hereinafter referred to as a "scan"). For example, a probe may query the application to determine overall disk usage by the application 42. If application 42 is a database engine, a probe may gather information regarding the physical structure of any databases managed by the database engine. For relational databases, the probe may gather mappings of the relational database's logical objects (databases, tablespaces (i.e. physical files storing database information), transaction logs, etc.) to the files used at computing device 40 to store the logical objects.

For each application 42, an agent data collector 48 typically includes several program portions (subroutines, objects, etc.) that are specific to the application of interest. That is, different applications may require different mechanisms to obtain the same class of information. As such, each portion of data collector 48 is capable of performing one or more specific queries of the application in response to application-neutral information requests. So, for a relational database, for example, agent data collector 48 may include a relational database neutral driver (i.e. common to relational databases generally) and database specific data collector portions (i.e. program portions specific to the inter-related application 42). The database neutral driver handles interaction with server interface 46 and executes the relational database specific data collector portions. As a result there may be one or more data collectors for each of the supported databases. For example, a data collector portion may query the database catalog tables and create a tree of objects to describe the physical structure of the database. This object tree that is returned to agent data collector 48 and then transmitted to the server 50 using server interface 46.

By way of a more specific example, an ORACLE database specific agent data collector, preferably includes software portions to query an ORACLE database engine to extract, for example:

the version of the ORACLE software;
the names of all tablespaces maintained by the server engine;
the names and sizes of all datafiles maintained by the database engine;
the relationship of datafiles to tablespaces;
the amount of freespace available in each datafile;
the names and sizes of the control files;
the names and sizes of the redo log files;
the names of the archived log directories; and
the amount of storage consumed by the archived log directories.

For example, the ORACLE specific data collector portion of data collector 48 interfaces with application interface 47 to the drive the ORACLE SQL query process. It uses the Database, Tablespace and log SQL queries to determine the structure of the database. The SQL queries, for example, gathers the following information about an ORACLE database: database block size, names and sizes of all control files, and archive log mode. The SQL queries return the names and size of the tablespaces, datafiles, logs used by an ORACLE database.

By contrast, a scan collects specific data from an application, based on provided parameters. For a database, such a scan may examine how storage resources are allocated to tables and indexes, and calculate the total amount of storage consumed by individual database users. So for a relational database, a scan operates on specified tablespaces or databases, depending on the database type, rather than on the entire database. In the case of an ORACLE database, the tablespace is scanned. For other relational database it may be the database that is scanned.

The data collected during such a scan is controlled through parameters typically maintained at the server. Typically, the nature of a scan is governed by a profile definition, described below, that determines the type and quantity of storage usage statistics gathered.

In addition to data collected by profiles, scans can also collect detailed storage usage information for individual user specified tables. When specifying the monitored table's creator and name, the following special masking characters can be used:

%—Matches any string of zero or more characters.

_—Matches any single character

As will become apparent, by creating query definitions in the GUI end users control the data collected by each agent 41 and the time and frequency queries are performed. Query definitions are stored within server repository [earlier operating repository]55 (FIG. 3).

A query definition includes one or more of:

the collection of tablespaces or databases that are to be queried;

the collection of profiles that are to be used;

an optional collection of monitored table specifications.

The agent processes a profile by initiating a task (e.g. an SQL query) to perform data collection. As the data is collected, each element is processed, each profile is examined to determine if the element matches the profile definition; if it does, the data is accumulated and returned in response to the query.

Figure 5:
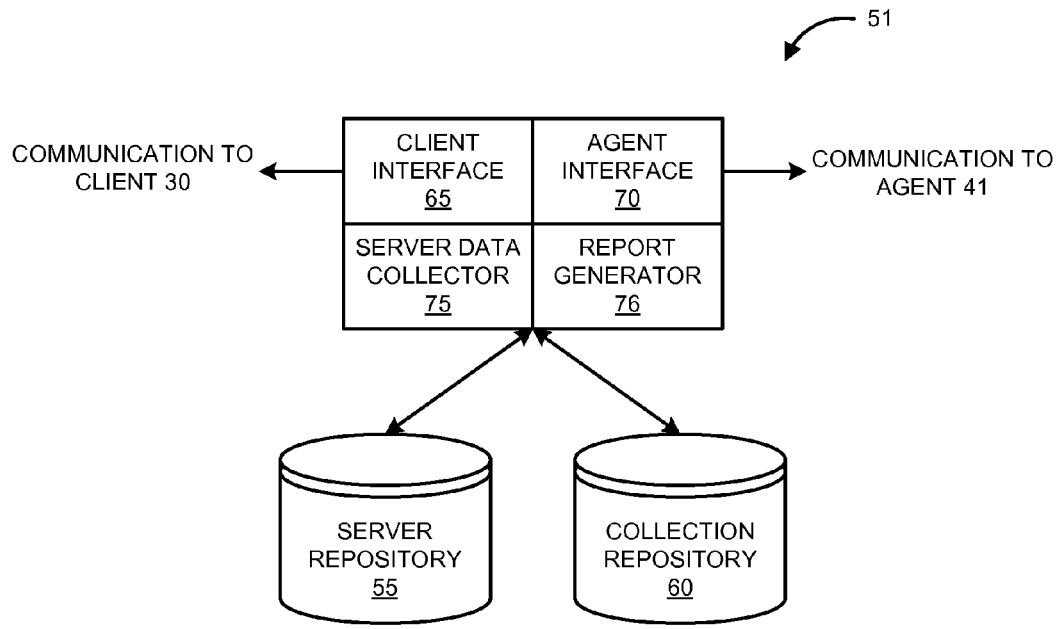
FIG. 5 illustrates server resource utilization data collection software used on the network of FIG. 1, exemplary of an embodiment of the invention.

FIG. 5 further illustrates the functional components of resource collection application 51 at server 50 (FIG. 1). As illustrated, an example of the resource collection application 51 includes three functional elements a client interface 65; an agent interface 70; and server data collector 75. Data collection repository 60 and server repository 55 are again illustrated.

Client interface 65 allows client computing device 30 access to information contained in collection repository 60, and to control the nature of data collection performed by server 50. For example, if client computing device 30 includes an HTTP browser for accessing server 50, server 50 may store and execute an HTTP server, and include suitable HTML forms, CGI scripts and Java scripts for presentation of the GUI at device 30. Alternatively, such HTTP server can be stored and executed at another computing device (not specifically illustrated) logically or physically connected with server 50. Accordingly, client interface 65 might provide the HTTP server with HTML data defining the HTML forms presenting user interface, or data to populate such HTML forms. Client interface software 65 need, of course, not use HTTP.

Agent interface 70 allows for communication with agents 41 at computing devices 40, by way of network 20. Agent interface 70 provides a collection of known services such as message creation, transmission and receipt, allowing server 50 to initiate data collection requests from agents 41 and for agent 41 to pass results of those requests and related status information back to server 50.

Data collector 75 includes normal management and control services associated with the operations of server application 51. Included in such services is code to initiate queries at agents 41 and store results of such queries within collection repository 60. Data collector 75 further preferably includes a scheduler causing server application 51 to periodically initiate agent queries.

A communication layer (not illustrated) provides communication with both client computing device 30 and computing device 40. Communication is used to control over agent 41 as well as to receive data from agent 41.

A report generator 76 aggregates and summarizes collected data, as detailed below. These services act with and on data maintained in collection repository 60 and server information repository 55.

Information contained in server information repository 55 includes server configuration, agent related query definitions, definition standard queries (profiles), agent upgrades to be sent, product license information, agent identifiers, application identifiers and location information and other information required for normal server operation. A query execution schedule that controls the time and frequency with which the query is performed is also stored within repository 55.

To facilitate data collections, scans may be performed using defined standard query types referred to as profiles. Conveniently, the same profile may be used again and again, with multiple agents and application types. When initiating application scans, one or more profile(s) may be used to perform the scan. Each profile includes parameters that define what statistics are gathered and how they are correlated. Profiles are used to specify exactly what statistical information is gathered during a scan and to control what is examined during the query. Default profiles may be used in addition to user defined profiles. Each of these default profiles allows a user to select a specific statistic to be gathered. To run a scan for a computer or tablespace and to gather all of the statistical information available, a user may simply select all of the default profiles to be used in the queries. Default profiles are provided represents a specific statistic that can be gathered (which is included in the name of the profile for convenient identification).

For an ORACLE database, for example, a profile can be defined to gather any combination of the following 5 storage usage statistics:

total storage used by each database user. This represents the total amount of storage consumed by the objects in each user's schema(s).

storage usage summary. This summarizes storage usage by object type.

largest tables. This statistic calculates the total amount of storage consumed by a table and its indexes. It returns the N largest tables. The value N is specified by the user when creating the profile.

segments with the most empty blocks. This statistic is only available when scanning ORACLE tablespace. An ORACLE segment is a collection of data blocks allocated to a database object such as a table or index. This statistic returns the segments having the largest number of unformatted, empty data blocks. A large number of empty data blocks may indicate a segment that has too much storage allocated to it. This is excess storage that can be reclaimed and made available to other objects. As with the largest tables statistic, users can control the number of segments returned.

segments with the most extents. This statistic is only available when scanning ORACLE tablespaces. An extent is a collection of contiguous data blocks allocated to a segment. A segment consists of one or more extents. Users can control the number of segments returned.

All of these profile statistics are aggregated or calculated at the tablespace or database level (depending on the type of database). For example, if a profile is defined to gather the 5 largest tables, and 4 ORACLE tablespaces are scanned, 20 tables would be returned—the 5 largest in each of the 4 selected tablespaces.

The following table illustrates example default profiles stored within server repository 55.

| Default Profile Name | Description |
| --- | --- |
| DB User Space | Gathers statistics about the user space usage within a database |
| Largest Tables | Gathers statistics on the n largest tables. (20 is the default amount) |
| Segment Most Extents | Gathers statistics on the n segments with the most extents. (20 is the default amount) |
| Segment Most Unused Space | Gathers statistics on the n segments with the most empty used space. (20 is the default amount). Empty used space represents the space allocated to a segment that is currently empty/not being used. Gathering this information can help a user discover space that can be reclaimed and allocated to other objects. Specifically, this Profile may find objects that are over-allocated (not using all their associated free space), find the free space that exists above a table's "high-water" mark (the "high water mark" is the highest block that was written for a table), find segments that have the largest amount of blocks that are not filled. |
| Summary | Summarizes space usage by tablespace, such as how many segments areain a tablespace, how many of those segments are tables, indexes, etc. |

Profile specific statistics are collected from the database queried as specified for each of the 5 statistic types described above. Statistics from the ORACLE descriptions contained in the ORACLE catalog are collected.

Server data collector further 75 saves collected data in the collection repository 60.

In operation, a user or administrator defines desired jobs including queries (i.e. probes and scans) to be performed at computing devices 40. Typically, desired queries (i.e. probes or scans) are defined by the user using a GUI presented at computing device 30. Screen definitions may be stored within server repository 55 at server 50, and provided to client computing device 30. Information collected by way of these screens is stored in server repository 55 for later use by server data collector 75.

Figure 6A:
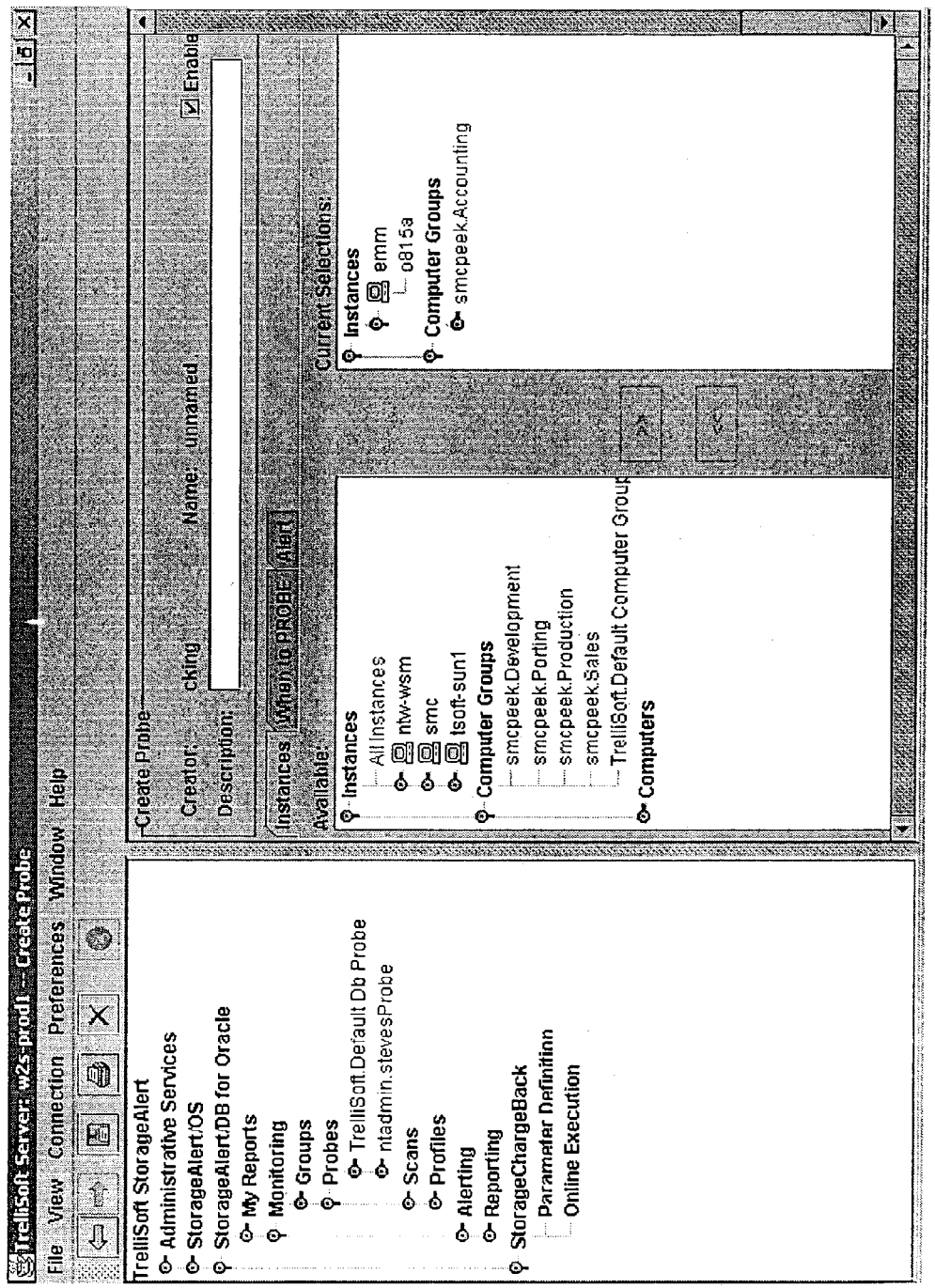
FIGS. 6A–6B, 7A–7E and 8 illustrate a graphical user interface illustrating configuration screens used to configure resource utilization data collection in the network of FIG. 1.
Figure 6B:
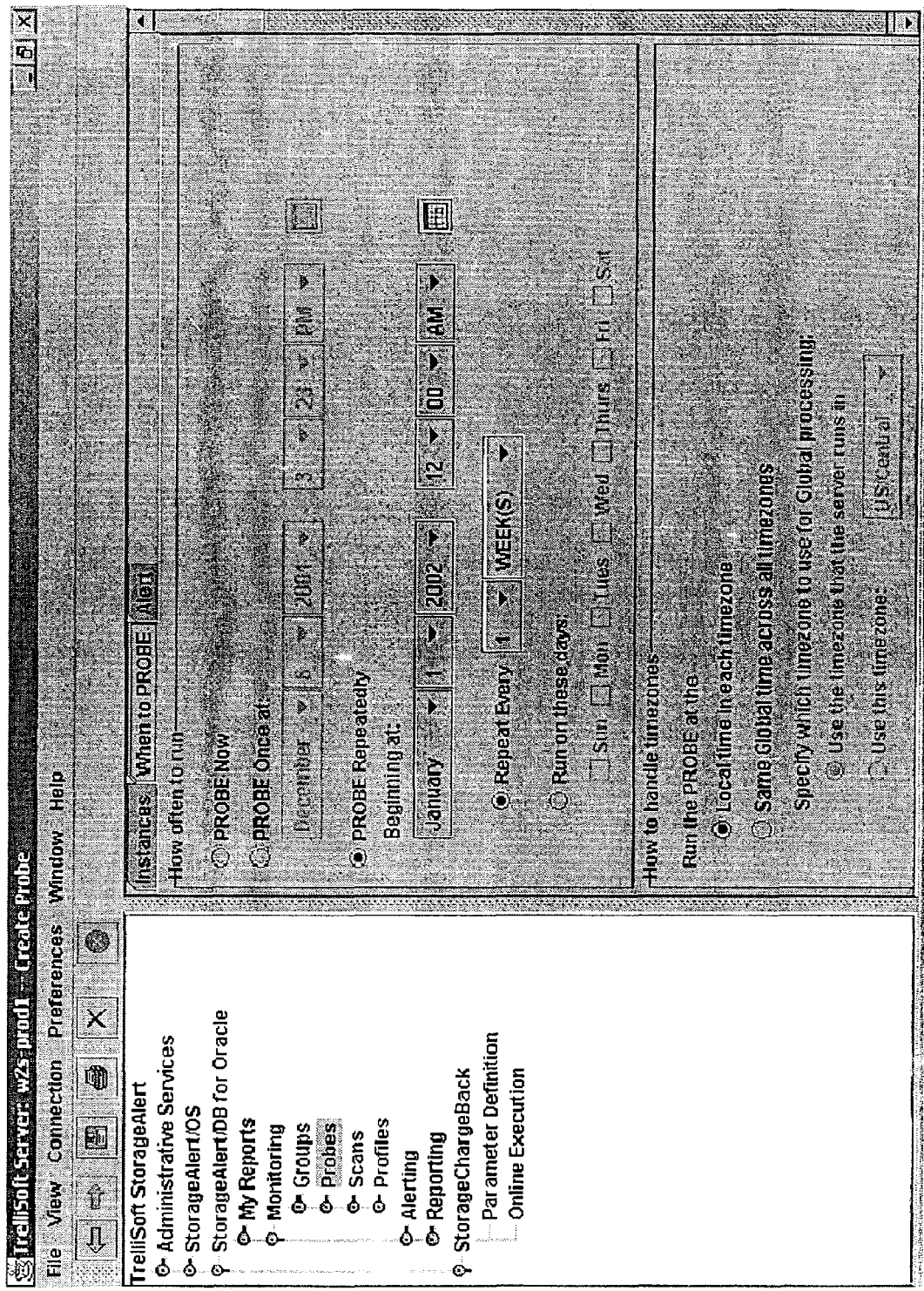

Example screen shots illustrating probe definitions are illustrated in FIGS. 6A and 6B. As illustrated, the user or administrator may define instances of applications to be monitored using the screen illustrated in FIG. 6A. The instances are defined by computer or groups of computers.

Next, the probe interval may be set using an interface screen 604, as illustrated in FIG. 6B.

Scans may similarly be defined as illustrated in FIGS. 7A–7E. As illustrated using the screen of FIG. 7A, the user may define the tablespaces and computers to query. Groups of tables are defined using the screen of FIG. 7B. Query profiles for individual tables are selected using screen of FIG. 7C. Information (e.g. names of tables, etc.) retrieved during an initial probe may be used to present scan configuration options on the represented interface.

Figure 7A:
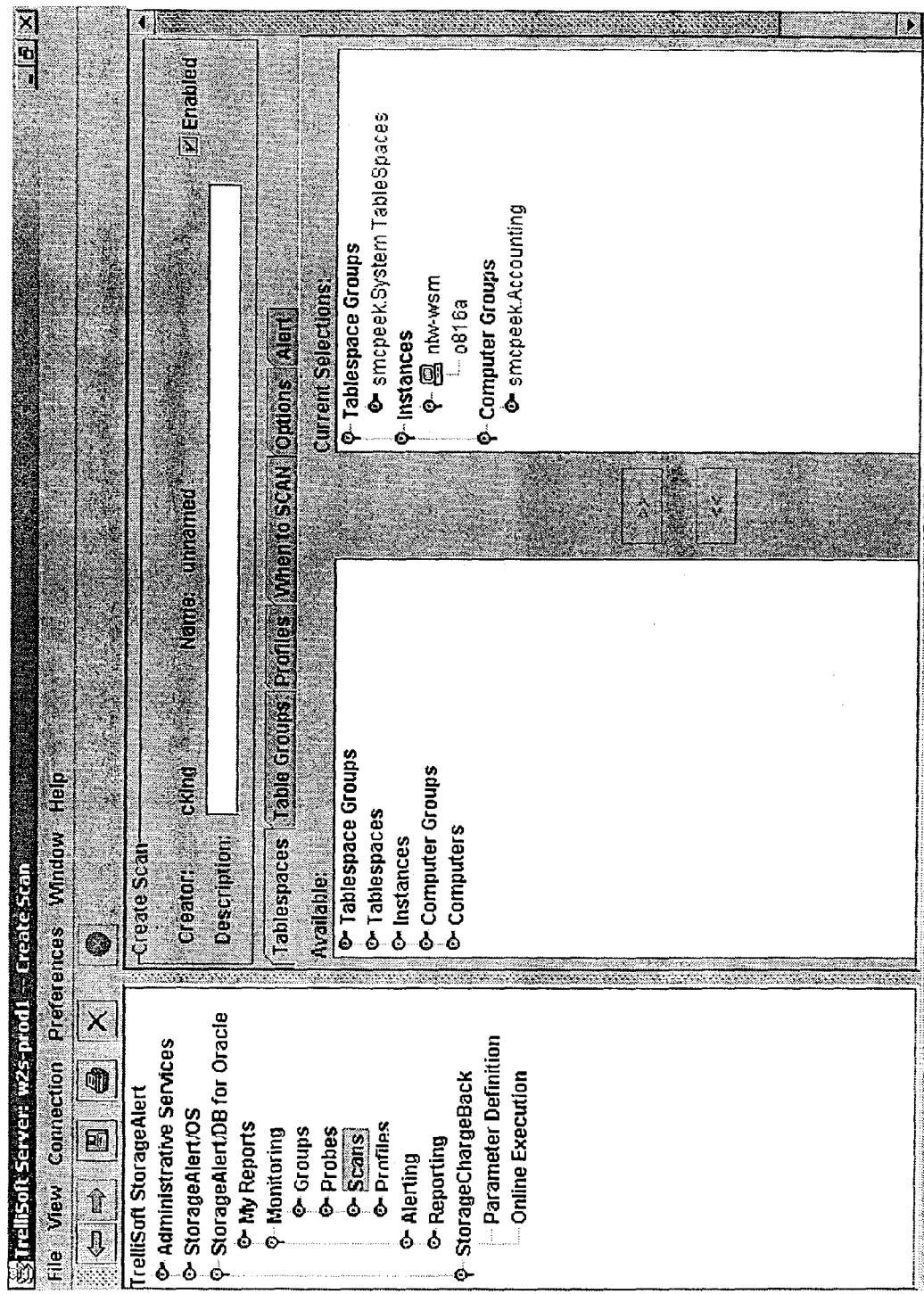
Figure 7B:
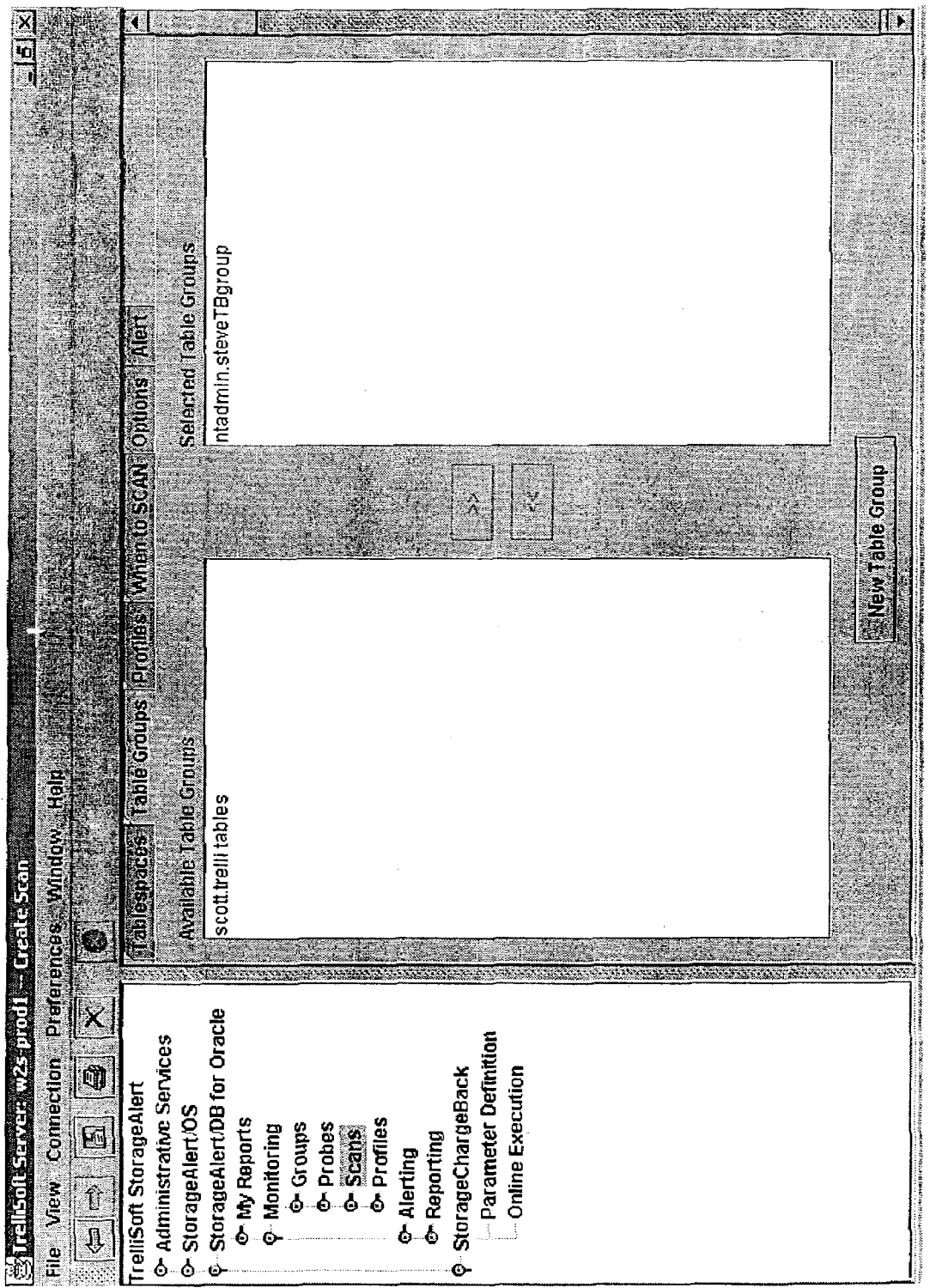
Figure 7C:
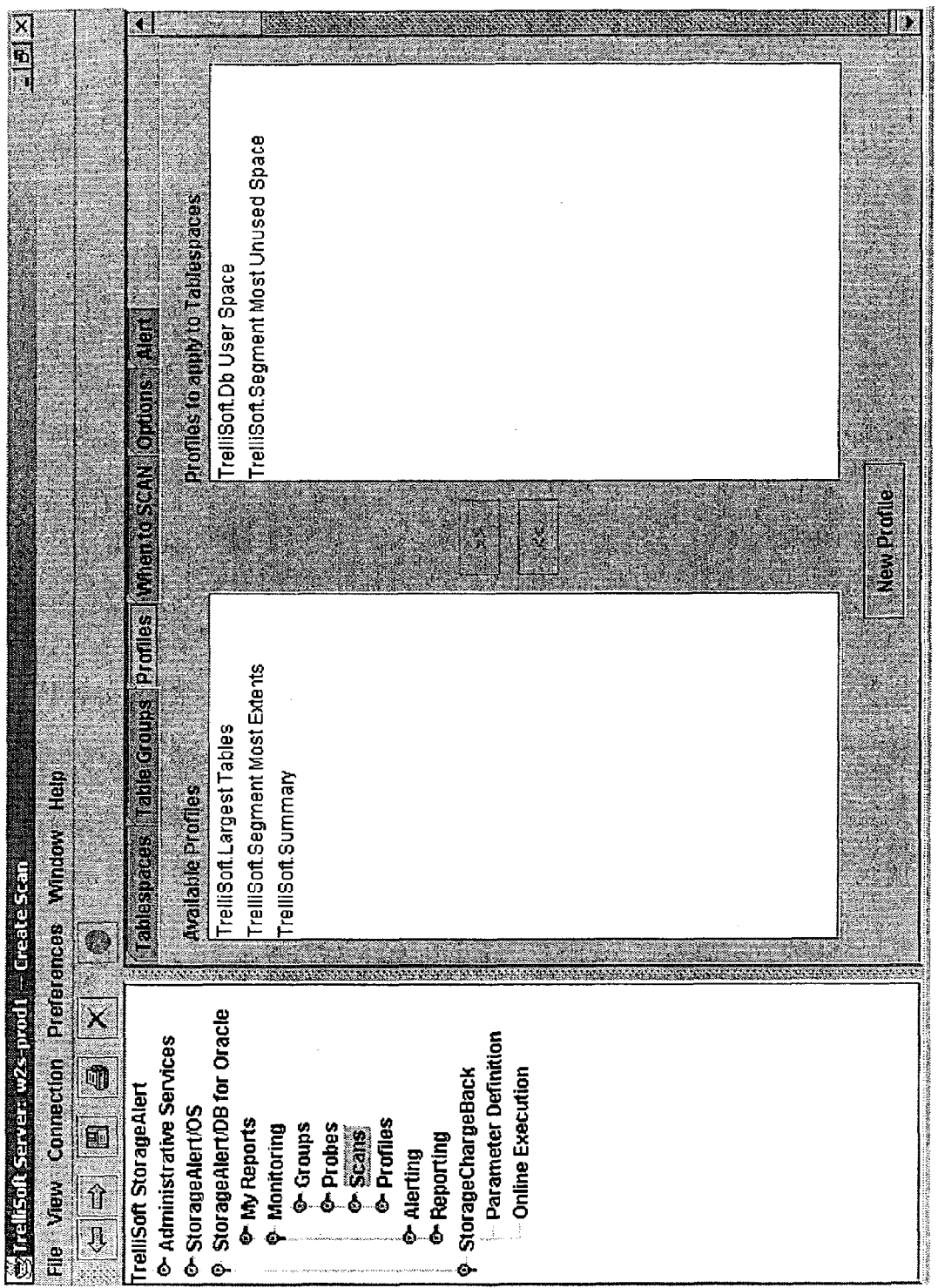
Figure 7D:
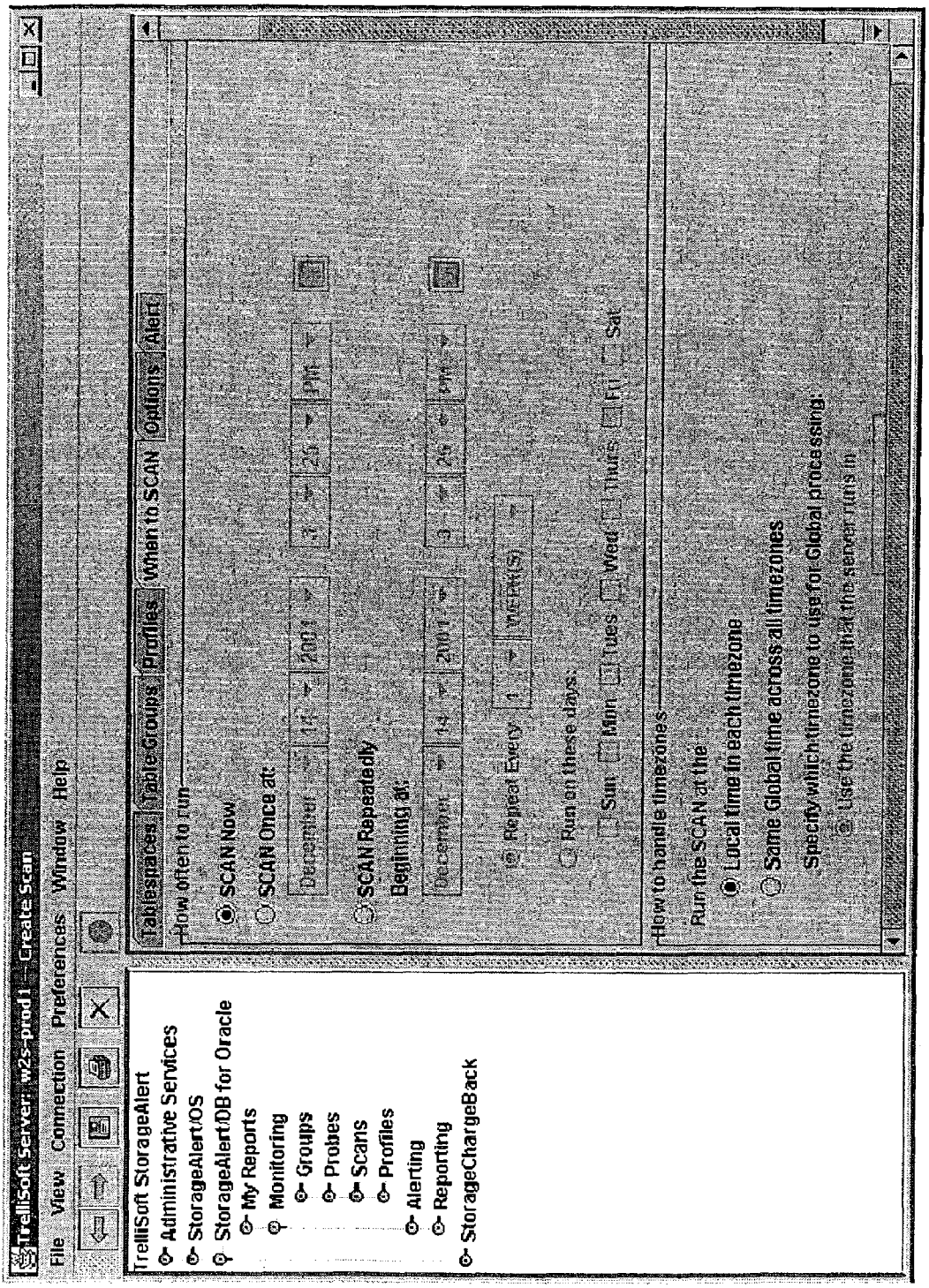

Scan options may be defined using the screen of FIG. 7D. Options may define additional data to be gathered during a scan. It is an option so that the scan is not always slowed by the option, if not required.

Figure 7E:
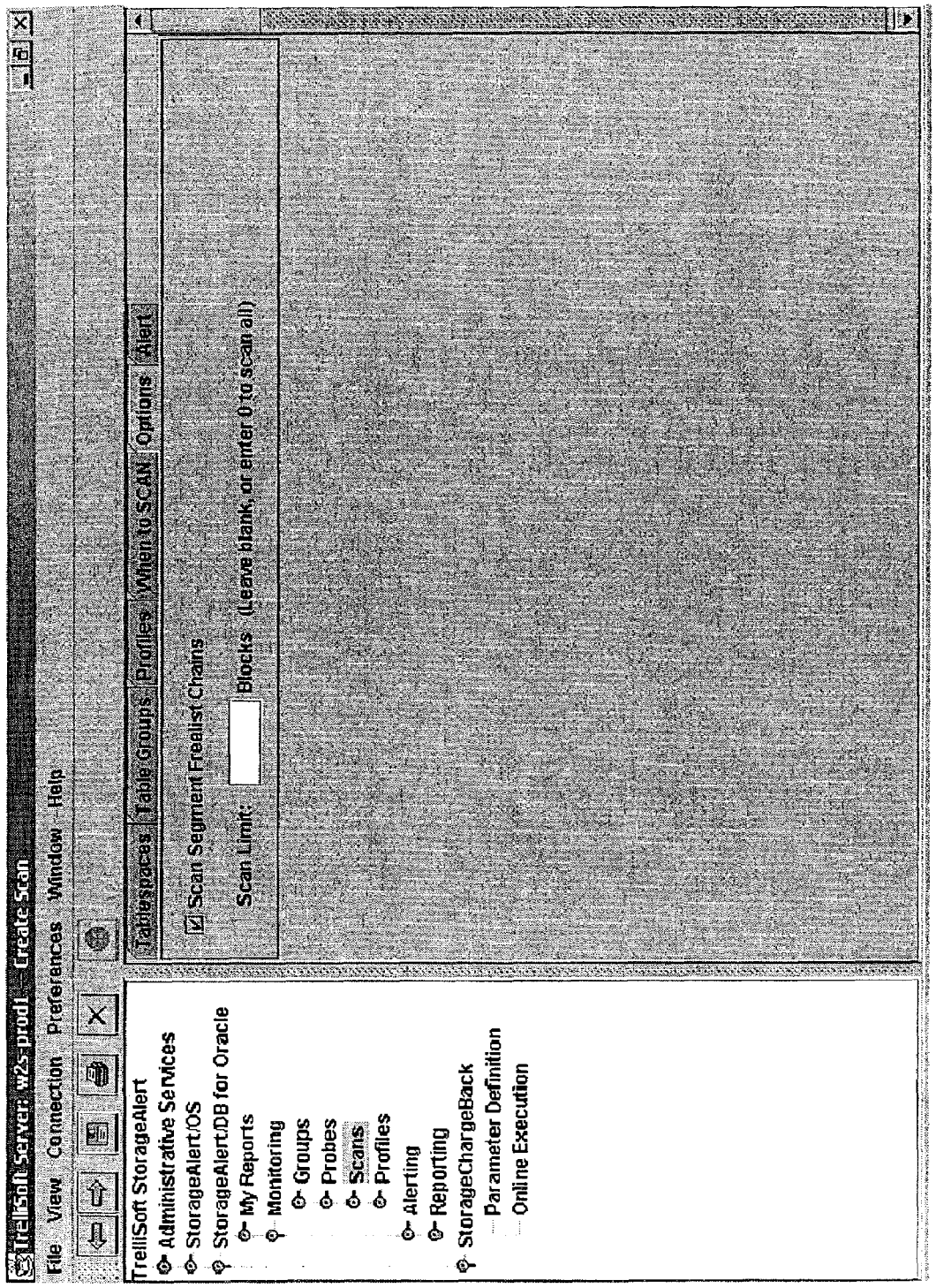

Again, the scan interval may be set using the screen of FIG. 7E.

Figure 8:
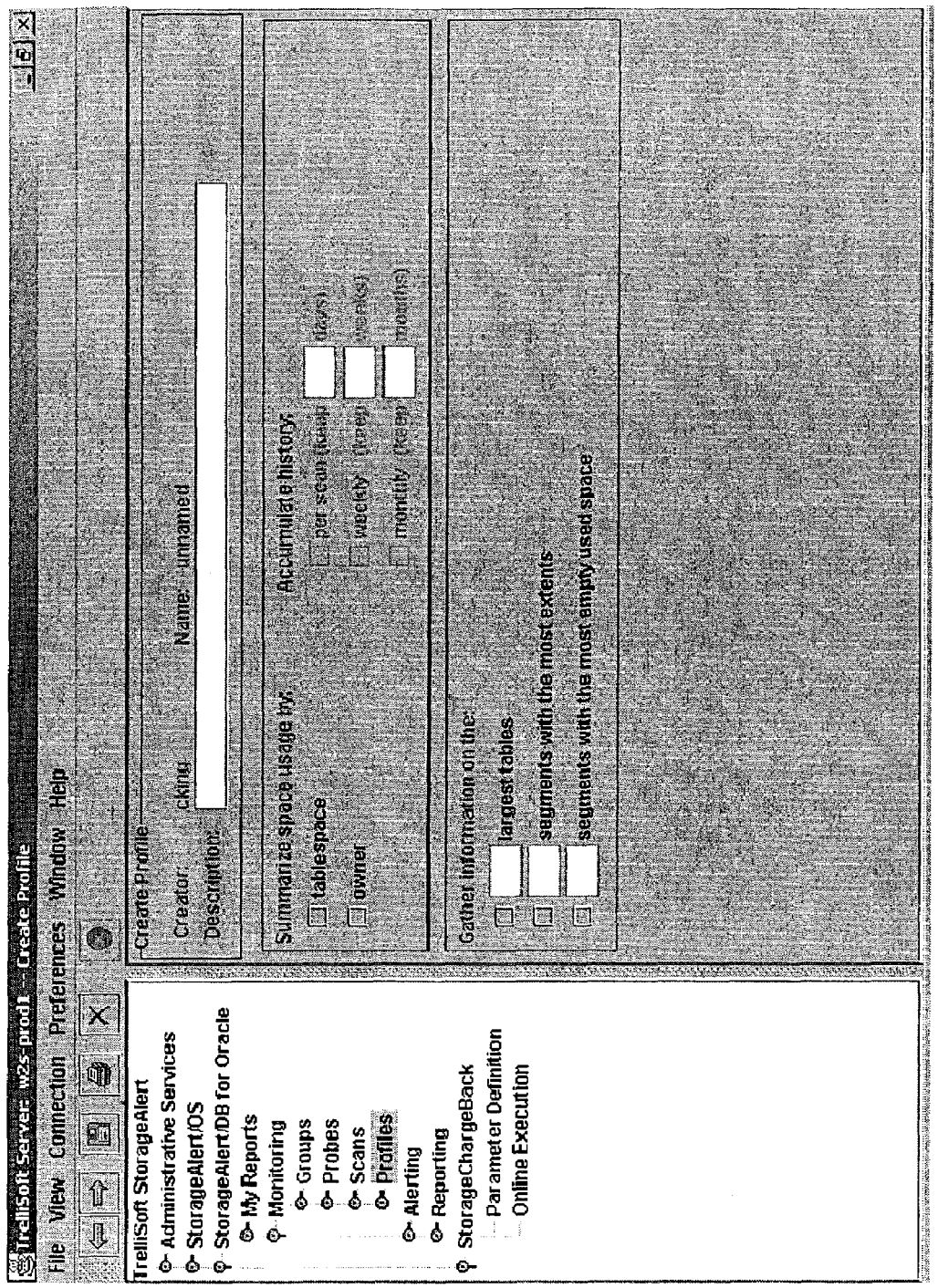

Individual profiles used for queries may be defined using the screen illustrated in FIG. 8. As illustrated, profiles may be defined to summarize space usage information by tablespace and/or table owner. A profile may similarly be defined to return a user specified number the largest tables, segments with the most extents and/or segments with the most empty freespace.

Figure 9:
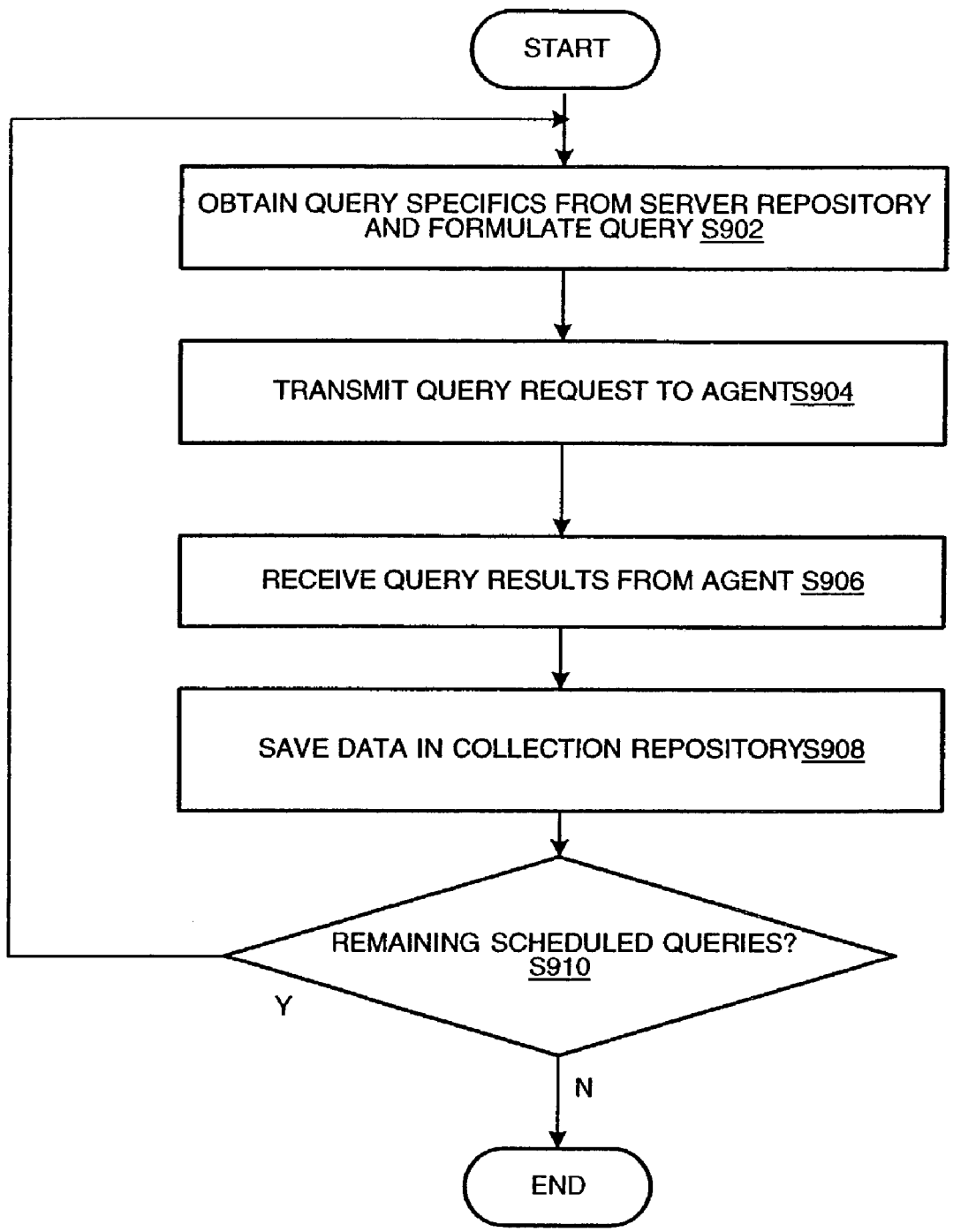
FIG. 9 is a flow diagram illustrating the process steps performed during resource utilization data acquisition by a server of FIG. 3.

Next, server 50 initiates a probe or scan of application resource usage through agents 41. Server 50 may initiate probes and scans at all, or selected agents. Queries may be scheduled, or initiated by Liser interaction, for example, through a GUI at computing device 30. Basic steps performed by server 50 during a scheduled probe or scan are illustrated in FIG. 9. So, upon initiating a scheduled query, server data collector 75 initially obtains information identifying the nature of the probe or scan, and the identity of the agent to be queried from repository 55 in step S902. Information retrieved from collection repository 55 includes: the tablespaces or databases that are to be queried; the profiles that are to be used; monitored table specifications; database login IDs and passwords (as required to gain access to database applications). Conveniently, server data collector 75 needs no knowledge of what whether a probe or a scan is to be performed. It merely dispatches query requests to the agent(s). The agents process the query request as a probe or scan, as requested. A message representing the query (e.g. probe or scan) is packaged in S904. The packaged message includes query parameters, database login IDs and encrypted passwords as necessary for the processing of the query on the remote system of the target agent 41. The message is then dispatched through agent interface 70 over network 20 to the agent 41 of interest. The agent 41 may be identified by network address, or the like. In step S906, server data collector 75 receives a response from the identified agent; parses the response; and stores the results of the query in collection repository 60 in step S908. As a result of step S910, Steps S902–S908 are repeated until all probes and scans scheduled for the present time have been performed.

Figure 10:
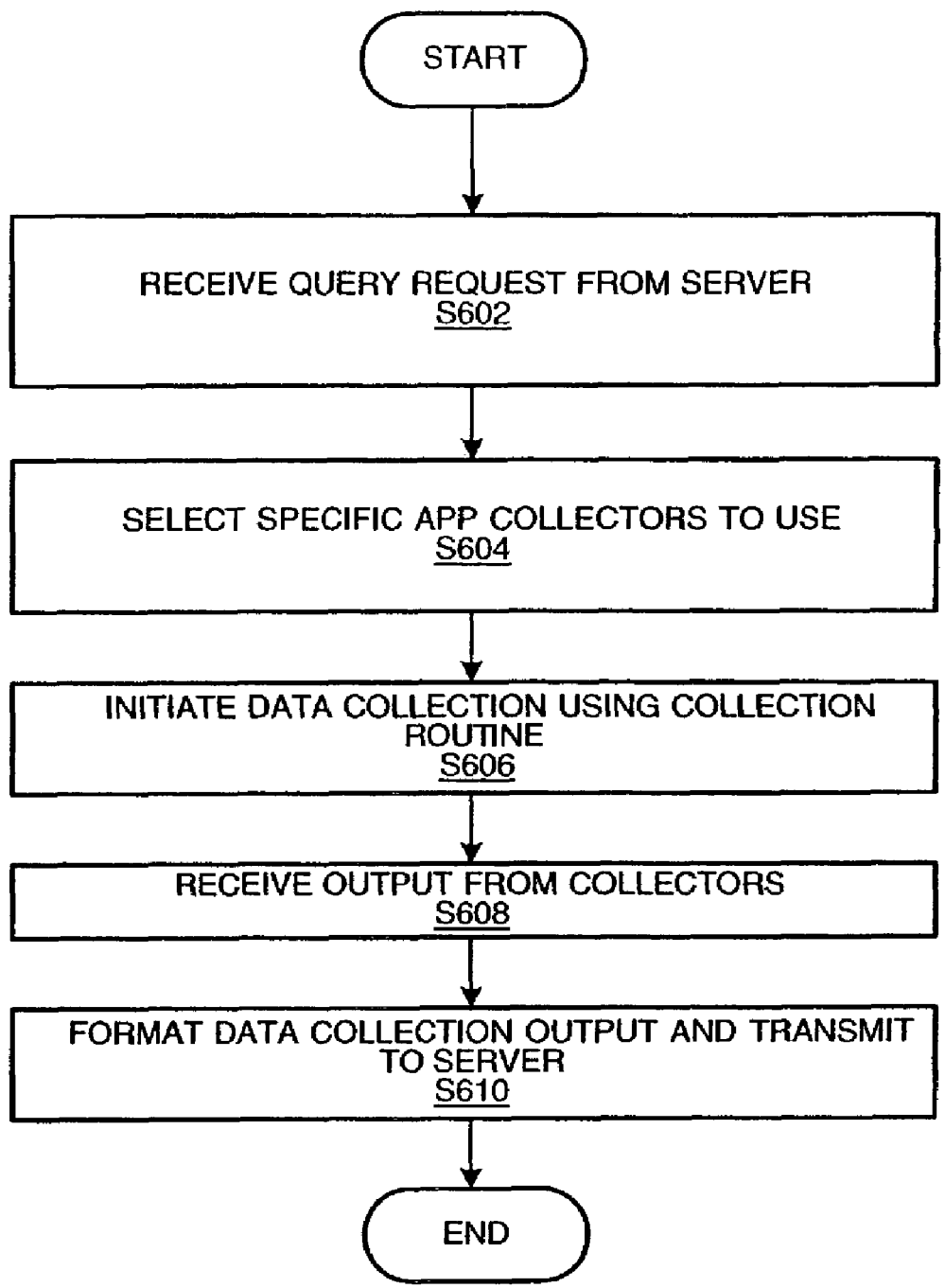
FIG. 10 is a flow chart illustrating method steps performed during resource utilization application data acquisition by a agent of FIG. 3.

Steps performed by an agent 41, in response to receiving a query request are illustrated in FIG. 10. In step S1002 server interface 47 of agent 41 receives the query request. A query request may, for example, be detected by receipt of a message at a monitored logical port at the IP address of the computing device 40. The query request may be received as a single message, or as a series of messages requested by the agent 42 and provided by server 50. As noted, the data collection request is preferably not overly application specific. In this way, multiple applications of the same type may be queried at server 50 using the same server side query request. Using the received query, agent 41 in step S1006 identifies a program portion of data collector 48 to initiate the query at application 42. The query request is parsed as necessary. Any necessary application logins and passwords necessary for the target application are provided from server 50. As noted, typically, different types of data requests may be handled by one of the different program portions (i.e. subroutines, objects, etc.) of agent data collector 48, described above. In this way, like query types may be parsed and analysed differently for unique querying of application 42. The portion of data collector 48 which performs the associated query is executed in step S1006.

Results of the query are returned by application 42 and received by agent 41 in step S1008. Results are packaged and transmitted to server 50 by way of sever interface 46 in step S1010. Possibly, agent 41 may cache the job output in preparation for transmission to server 50 in agent repository 44. Optionally, agent 41 may await an acknowledgement from server 50 that the transmitted results were received (not specifically illustrated).

For example the query in step S1006 may be performed at application 42 using an SQL query to extract information such as; names and sizes of data files, control files, log files, names of tablespaces or databases as well as storage utilization information such as storage summary by object type, largest tables found, storage usage by user or in the case of the query being directed at a specific table, more detailed information pertaining to that table.

Steps S902–S908 (FIG. 9) may be repeated to dispatch multiple query requests corresponding to defined profiles to one agent and to the multiple agents at various application computing devices 40 of interest. Similarly, steps S902–S908 maybe repeated for each scheduled probe or scan. As noted, the agents are unique to the applications. Query requests stored at server 50 may likewise be customized to the particular application. Data collection types, parameters, and the like may be stored within server repository 55. At each agent, the query request is processed in accordance with steps S1002–S1000 illustrated in FIG. 10. For scans, as data is encountered, each profile is checked to see if the data is required for that profile. If so, the data is processed per the profile's requirements. Thus, at the completion of step S910 server 50 has collected resource utilization information of interest across distributed computing environment 10, to the level of detail dictated by configuration data within server repository 55.

Using collected data, server application 51 (see FIG. 3) may provide data to client computing device 30 to create reports. Server application may similarly dispatch alerts in response to collected data. Reports may be created by Java applets provided by server 50 to client computing device 30. Reports may be accessed through the user interface at client device 30, and defined and selected by the user. A person of ordinary skill will appreciate that a Java applet provided to client computing device 30 may be adapted to generate virtually any type of report based on the collected data. Alternatively, reports could be generated by other software running at client computing device 30 or at server 50. If reports are generated by server 50, they could be presented at client computing device 30 using HTML forms, or the like.

FIGS. 11A–11M illustrate several example reports generated by client 31, for presentation at client computing device 30 by way an applet running on browser software 31.

Figure 11A:
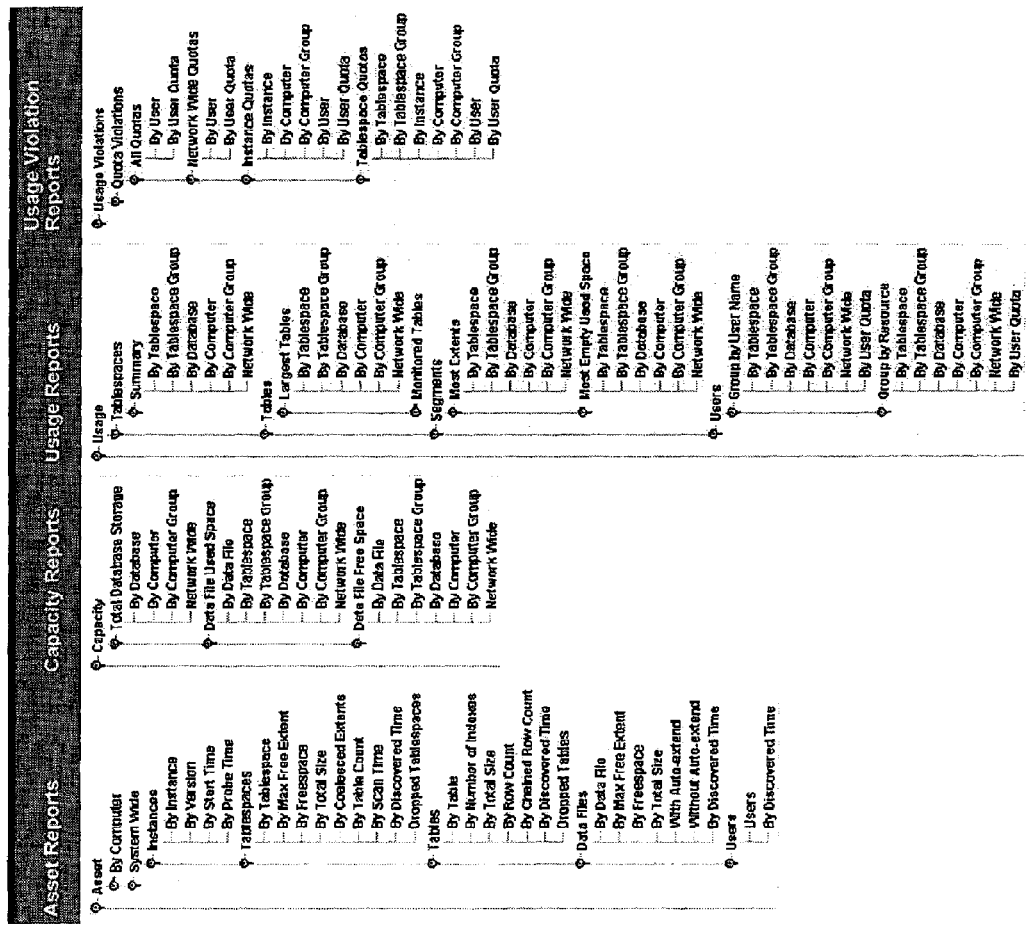
FIGS. 11A–11M illustrate a graphical user interface displaying various reports based on resource usage data collected in the network of FIG. 1.

Reports are constructed from the statistical information accumulated by querying agents 41 and stored in the collection repository 60. The reporting features allow selection of the instances, tablespaces, data files, control files, redo logs, archive log directories, and even users upon which to report. A table of example available reporting options is shown in FIG. 11A. Reports may be viewed at client computing device 30 as tables of data as shown, for example, in FIGS. 11C, 11H, and 11I or as graphical charts as shown, for example, in FIGS. 11F, 11G and 11M, providing the flexibility to obtain a very detailed vies of collected information or a very high-level overview.

Example report categories that may be generated include:

| Reporting Category | |
| --- | --- |
| Asset Reports | Displays the information gathered by Probes, including itemized information about instances, tablespaces, data files, control files, redo logs, and archive log directories. |
| Capacity Reports | view storage capacity at a database and data file level. For a specific Instance, computer, group of computers, or all the computers in an enterprise, view: how much storage is available for databases, how much storage is being used for databases, what percentage of database storage is free for expansion. The capacity reporting function provides the ability to view the storage capacity, used space, and free space for databases in a single view. |
| Usage Reports | monitor and report on the usage and growth of the consumption of database storage. View usage reports for tablespaces, tables, segments, and users. Use these reports to: view detailed information for tablespaces including their total size, used space, empty used space, # of tables and indexes, etc., identify the tables consuming the most space within an environment. View this information at the tablespace, database, and computer level, as well as at a network-wide level. identify the segments with the most extents and most empty used space. This information may be viewed at the tablespace, database, and computer level, as well as at a network-wide level. associate users with the amount of storage they are consuming on specific databases, tablespaces, groups of tablespaces, specific computers, groups of computers, and throughout the entire network. |
| Usage Violation Reports | create and enforce corporate storage usage policies. Report on violations of quotas that are set at the network-wide, instance, and tablespace levels |

Asset reports allow viewing of the information gathered by queries. Query results are itemized by the information about instances, tablespaces, data files, control files, redo logs, and archive log directories of interest.

Capacity reports present storage capacity at the database and data file level. For a specific Instance, computer, group of computers, or all the computers in an enterprise, view: how much storage is available for databases, how much storage is being used for databases, and what percentage of database storage is free for expansion. Capacity reports provide an ability to view the storage capacity, used space, and free space for databases in a single view.

Usage reports allow users to monitor and report on the usage and growth of the consumption of database storage. Usage reports provide views for tablespaces, tables, segments, and users. Use these reports to: view detailed information for tablespaces including their total size, used space, empty used space, # of tables and indexes, etc., and to identify the tables consuming the most space. These may be viewed at the tablespace, database, and computer level, as well as at a network-wide level. To identify the segments with the most extents and most empty used space, view this information at the tablespace, database, and computer level, as well as at a network-wide level. Use these reports to associate users with the amount of storage they are consuming on specific databases, tablespaces, groups of tablespaces, specific computers, groups of computers, and throughout the entire network.

Usage violation reports allow the monitoring and enforcement of corporate storage usage policies. Reporting is performed on both Quota Violations and Constraint Violations. With quotas, control over how much storage a user, or a group of users, can consume on: a tablespace or group of tablespaces, an Instance or throughout the entire network may be obtained.

Conveniently, reports may be generated from different perspectives, including:

|  | Description |
| --- | --- |
| By Instance | Use this clause to select the instances to report upon and the report that will be generated based upon those instances. |
| By Database | Use this clause to select the database to report upon and the report that will be generated based upon those databases |
| By Tablespace | Use this clause to select the tablespaces to report upon and the report that will be generated based upon those tablespaces. |
| By Tablespace Group | Use this clause to select the tablespace groups that to report upon and the report that will be generated based upon those tablespace groups. |
| By Computer | Use this clause to select the computers to report upon and the report that will be generated based upon those computers. |
| By Computer Group | Use this clause to select the computer groups to report upon and the report that will be generated based upon those computer groups. |
| By User | Use this clause to select the users to report upon and the report that will be generated based upon those users. |
| Network Wide | The reports and charts that will be generated on data, network wide. This provides a global view of the storage and storage usage for an entire enterprise. |

Figure 11B:
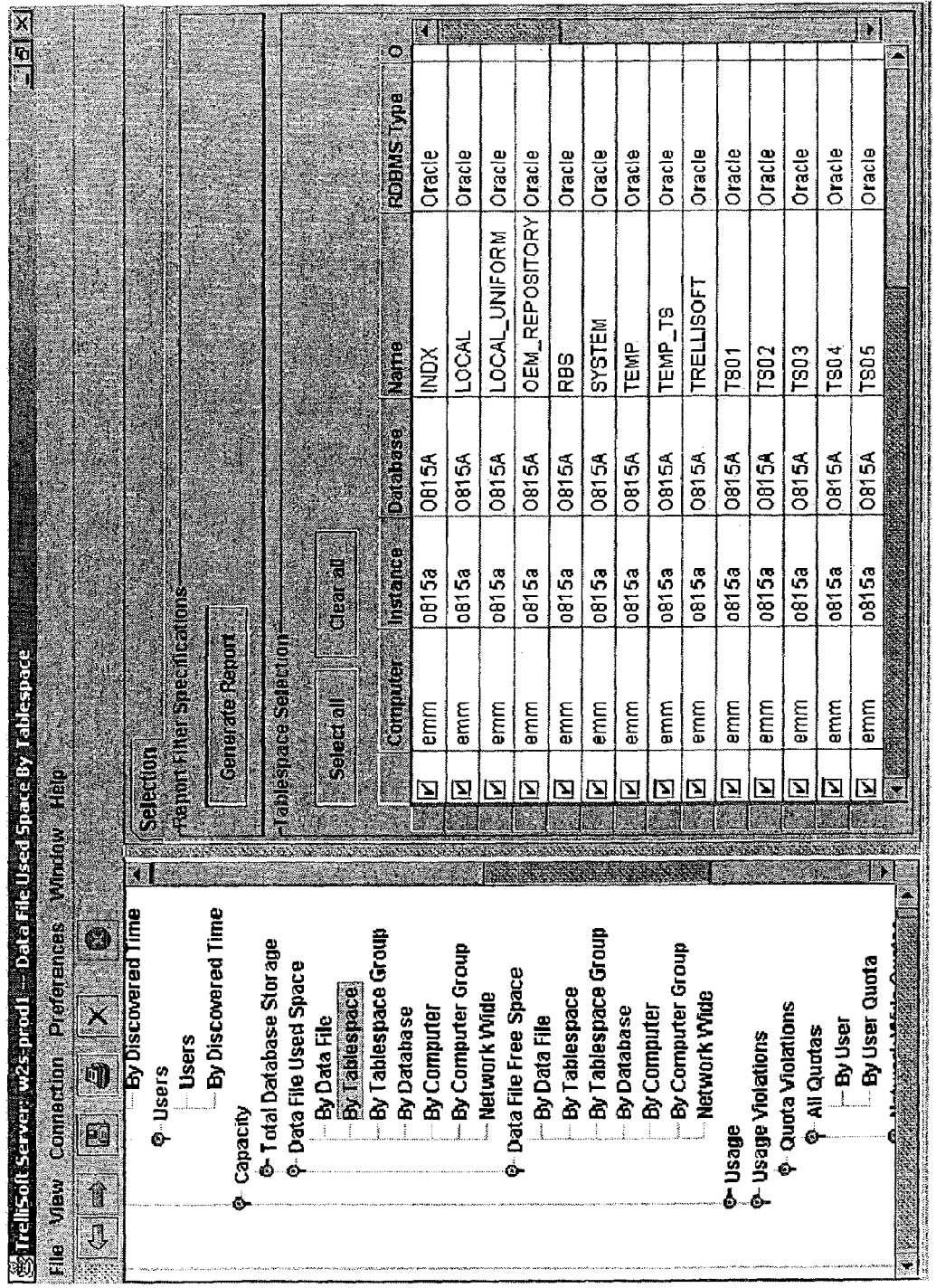
Figure 11C:
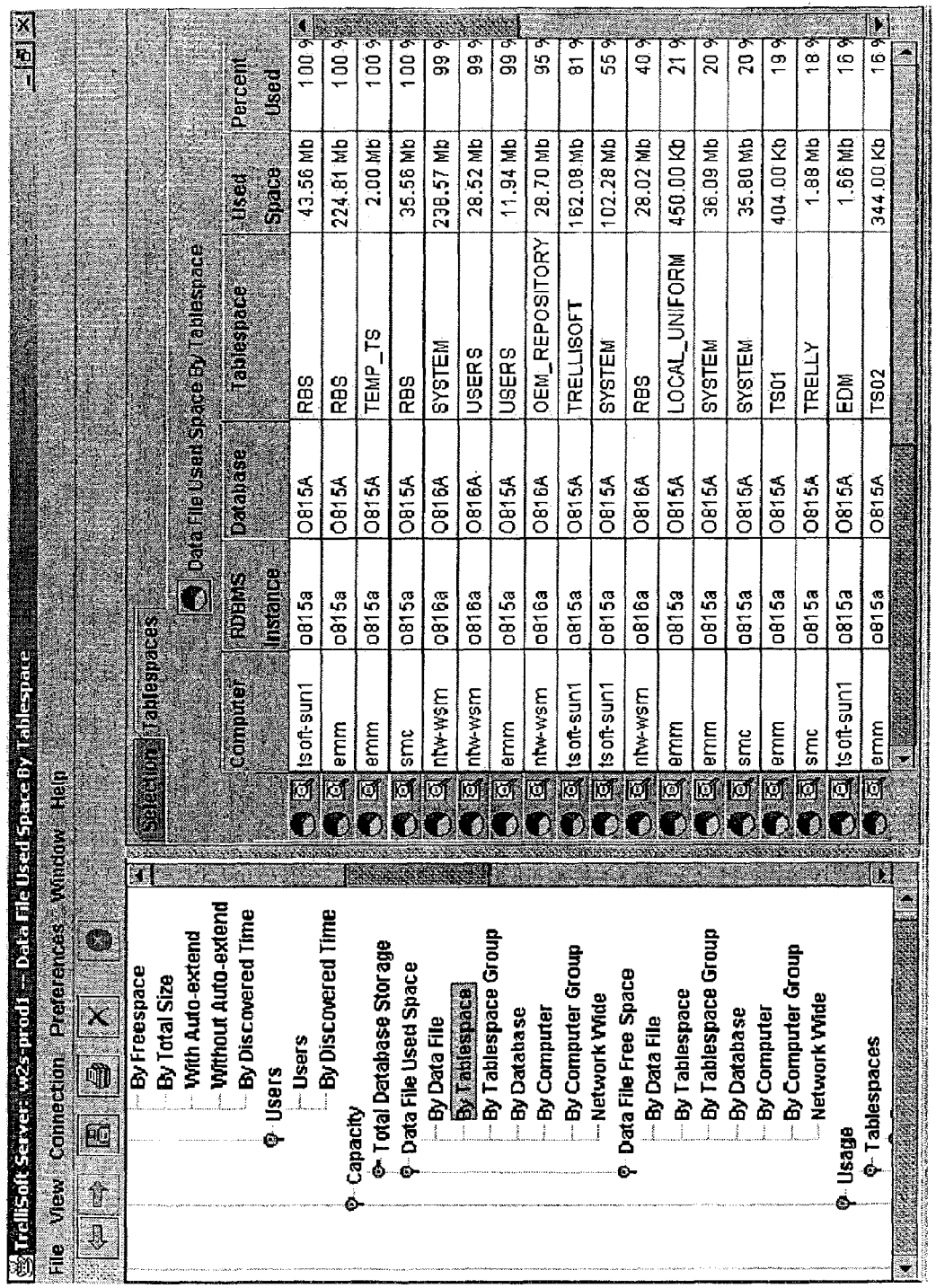
Figure 11D:
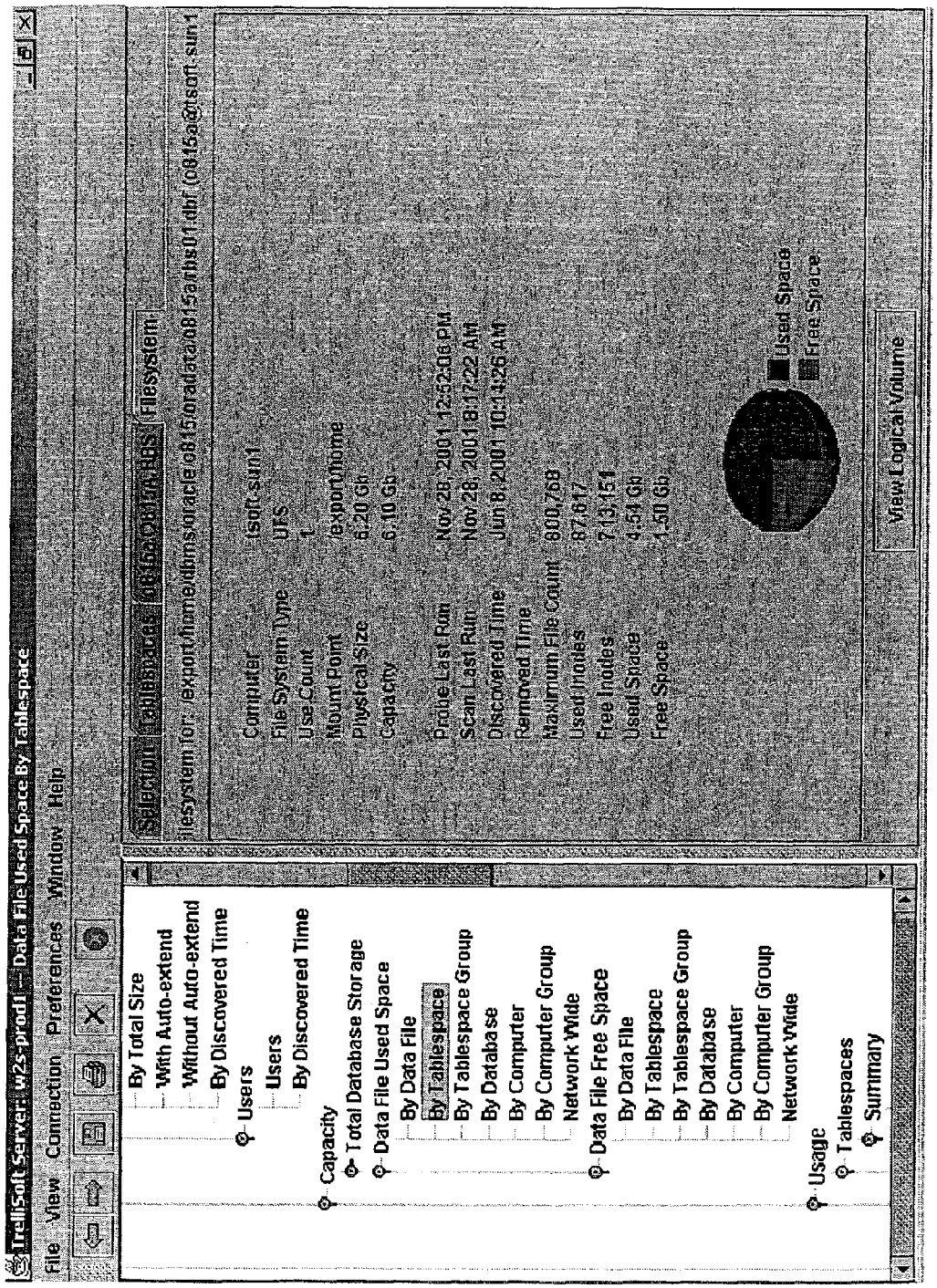
Figure 11E:
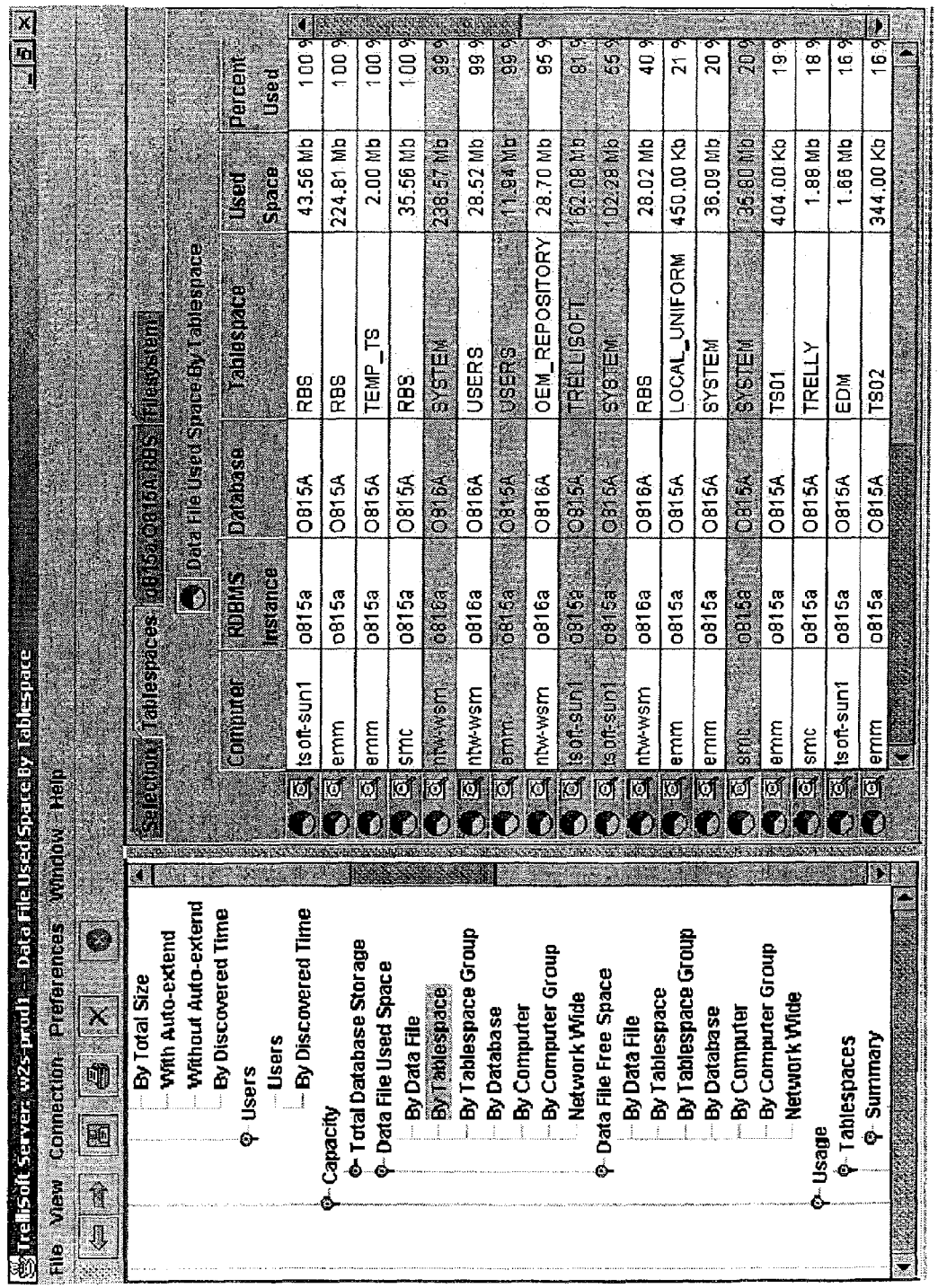
Figure 11F:
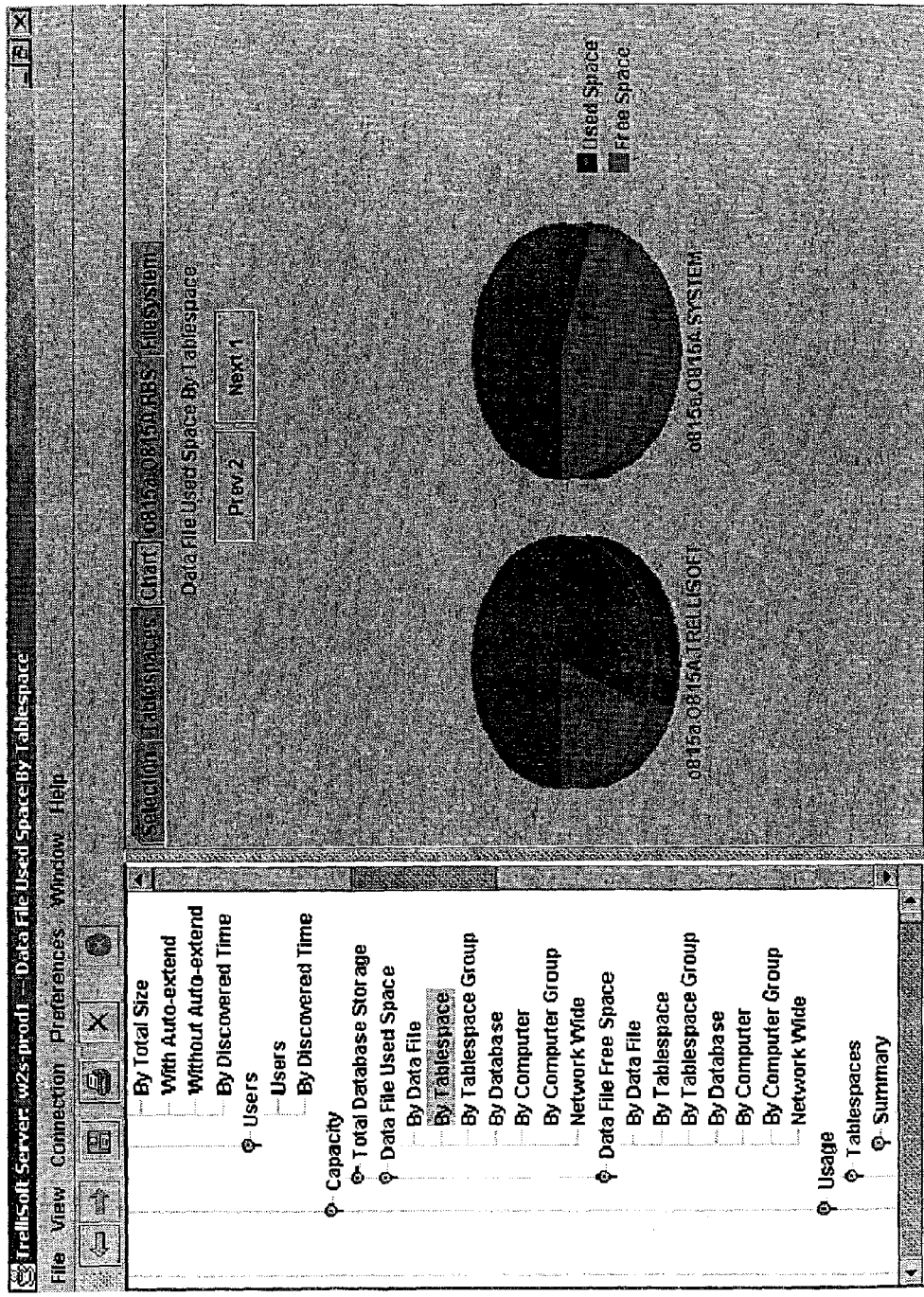
Figure 11G:
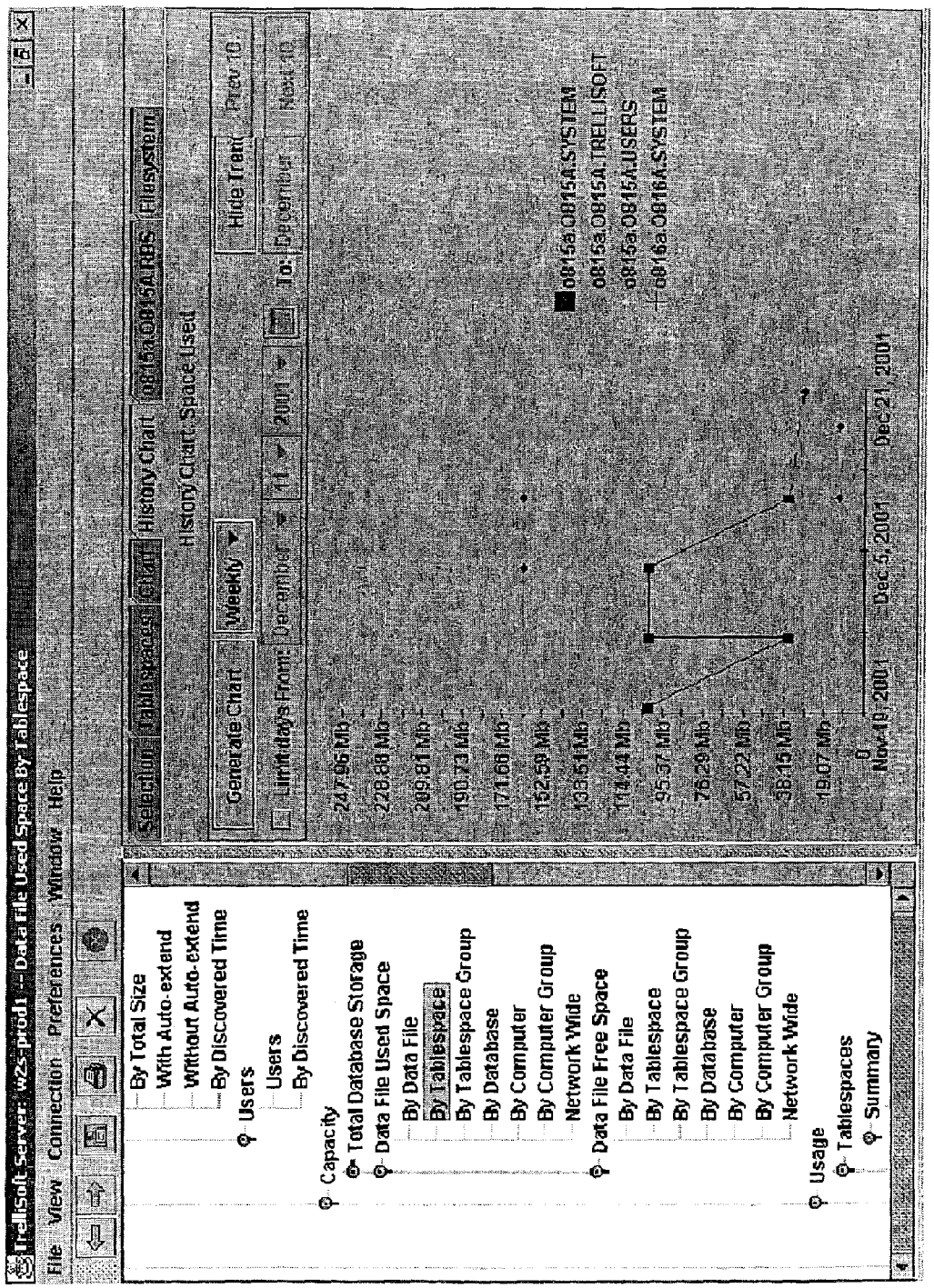
Figure 11H:
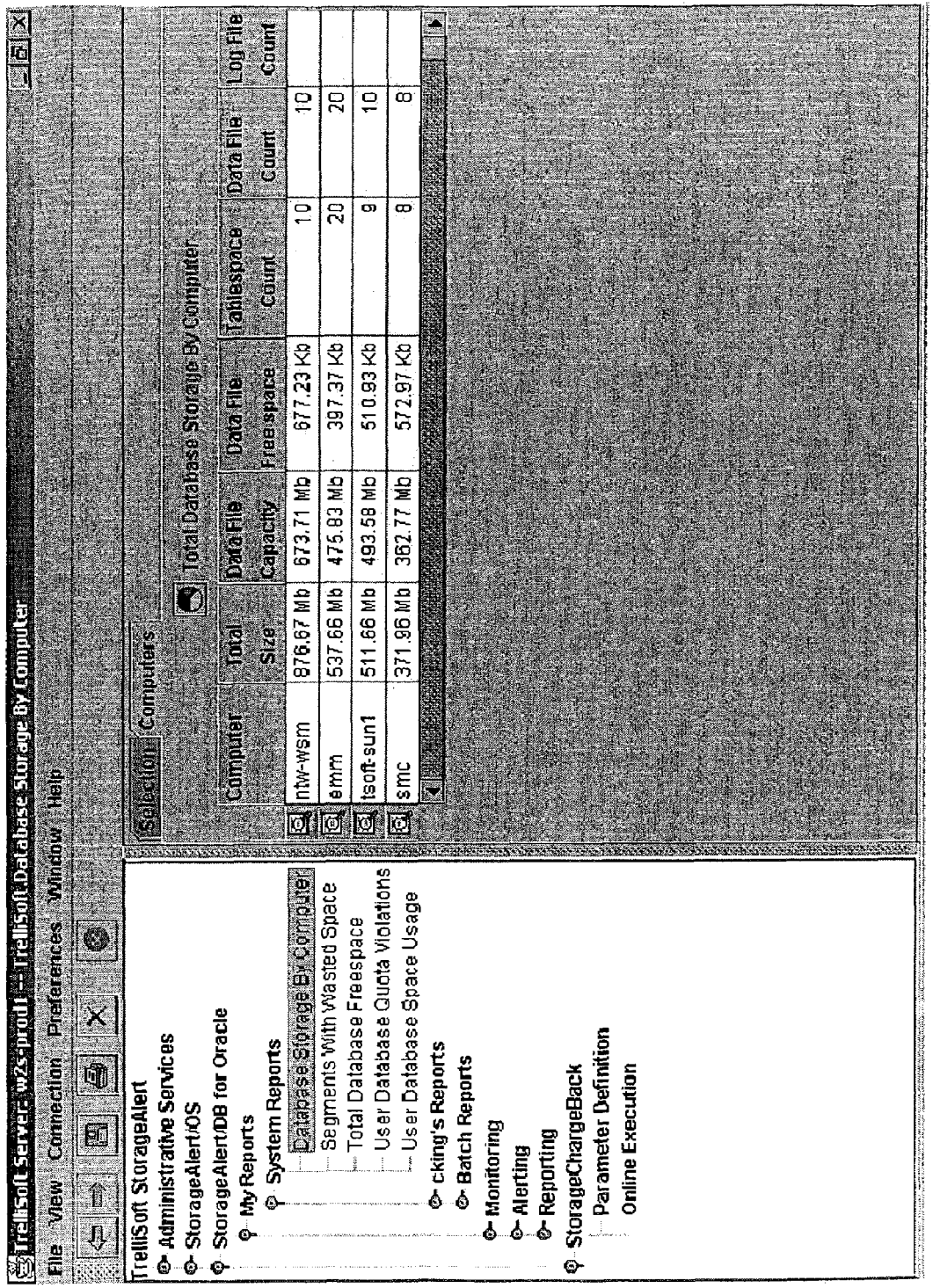
Figure 11I:
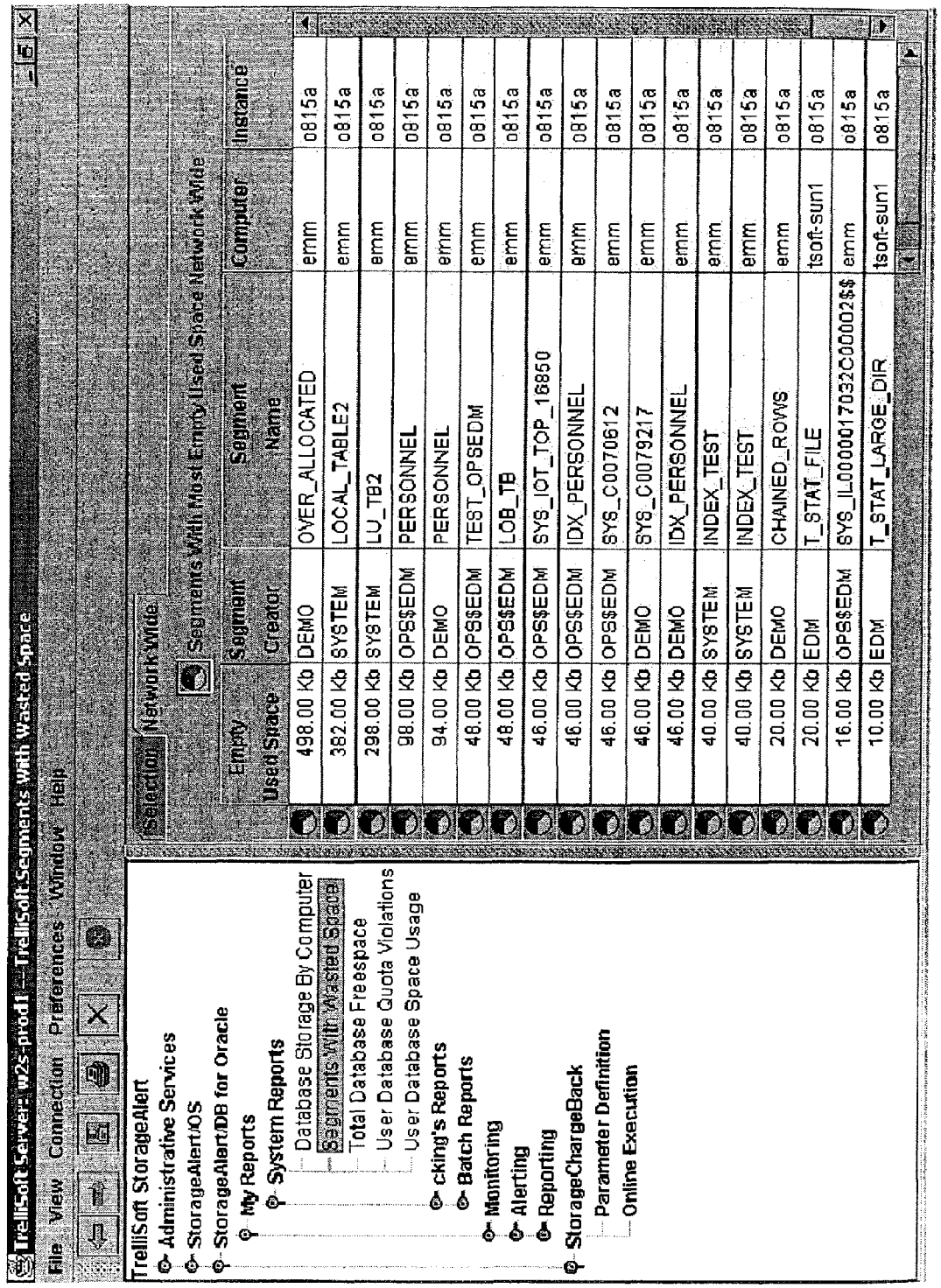
Figure 11J:
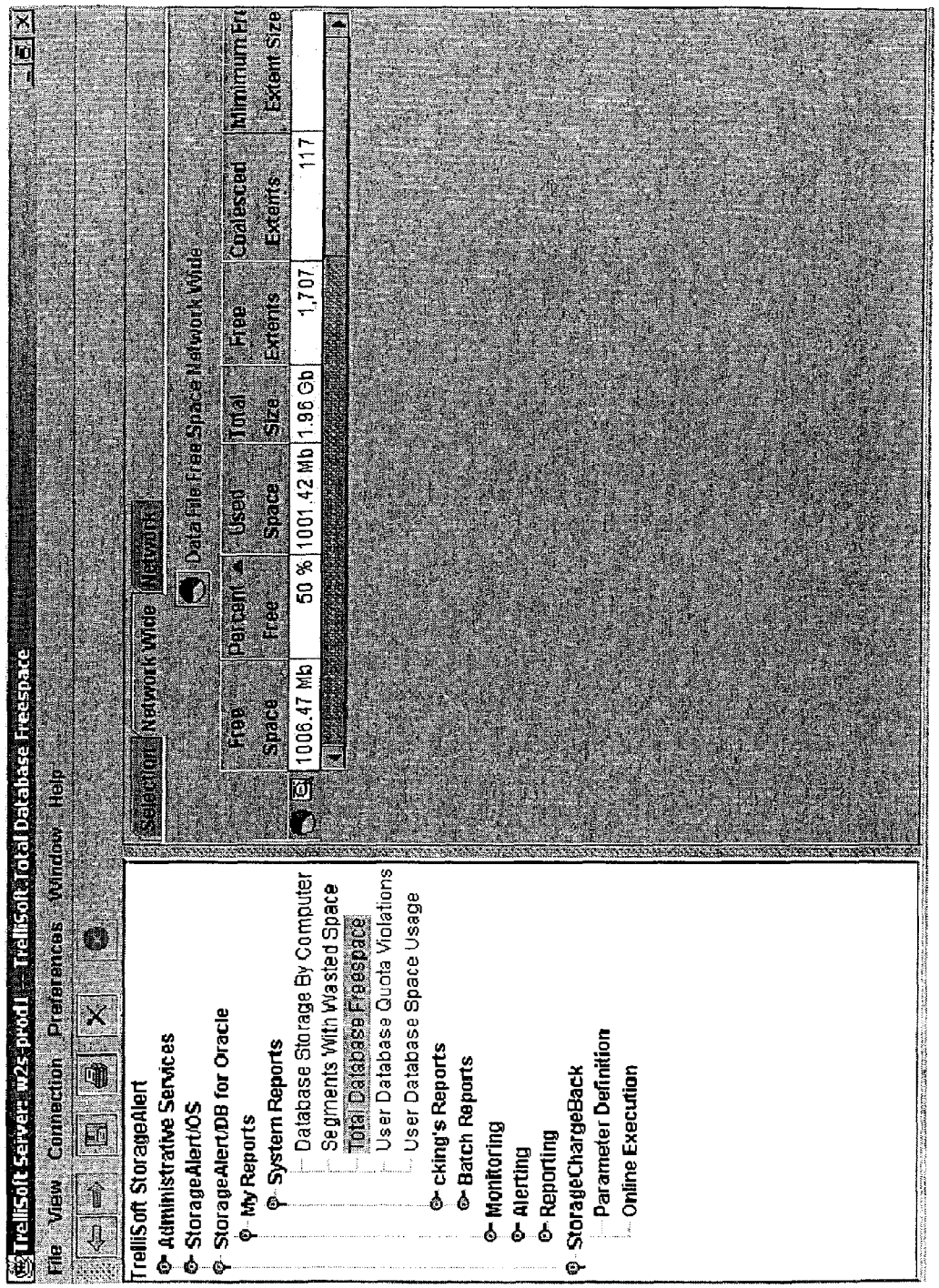
Figure 11K:
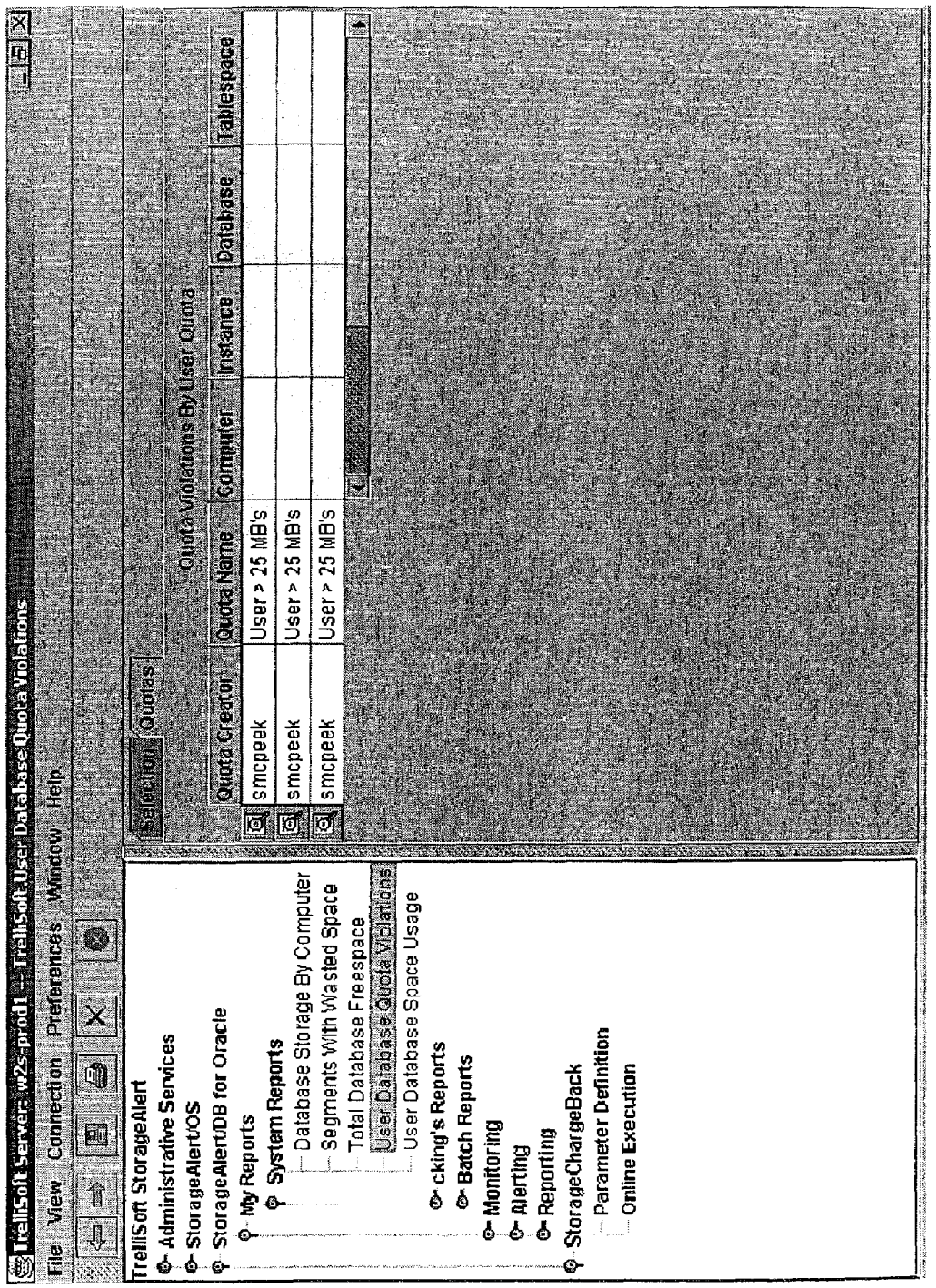
Figure 11L:
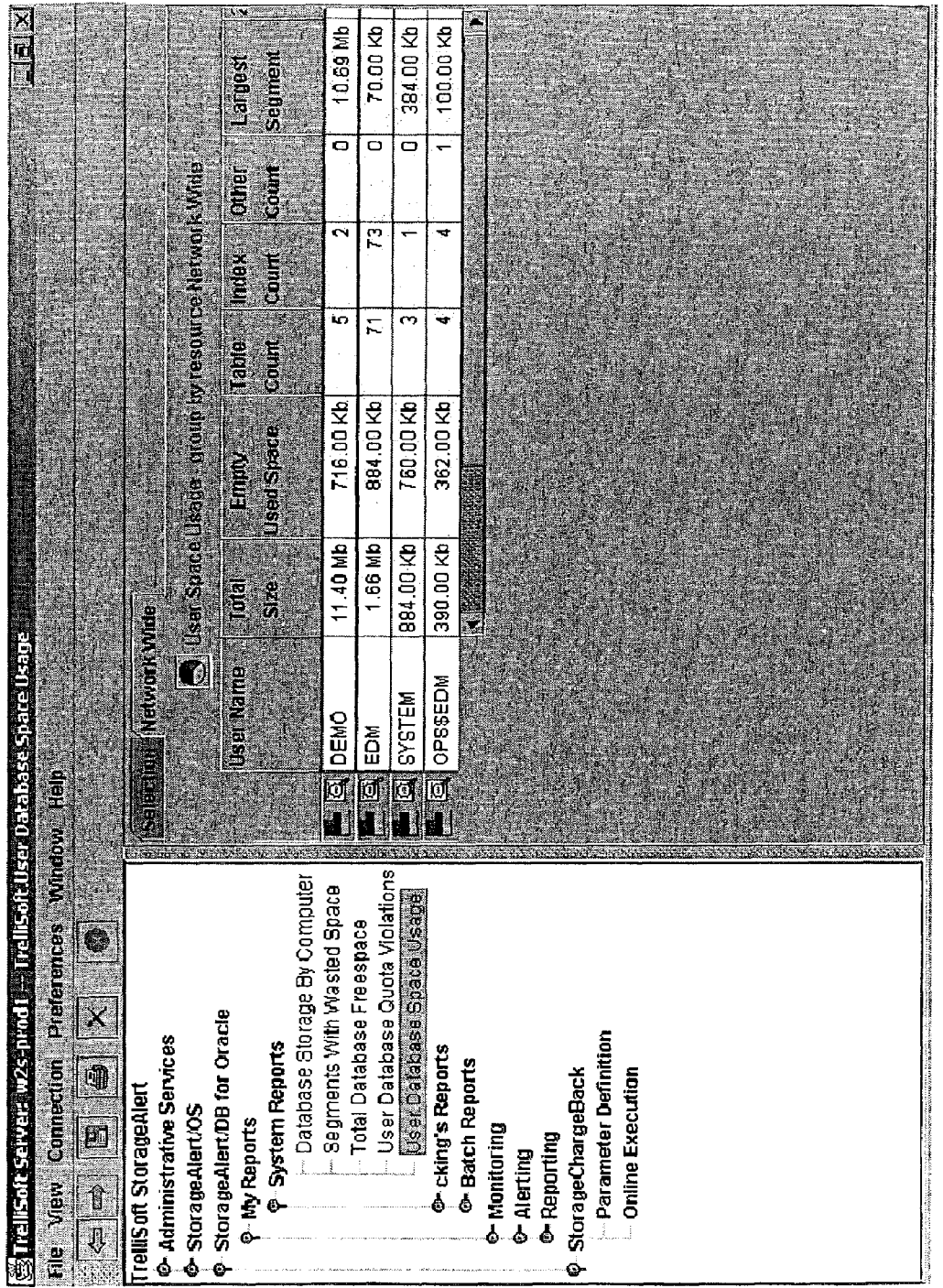
Figure 11M:
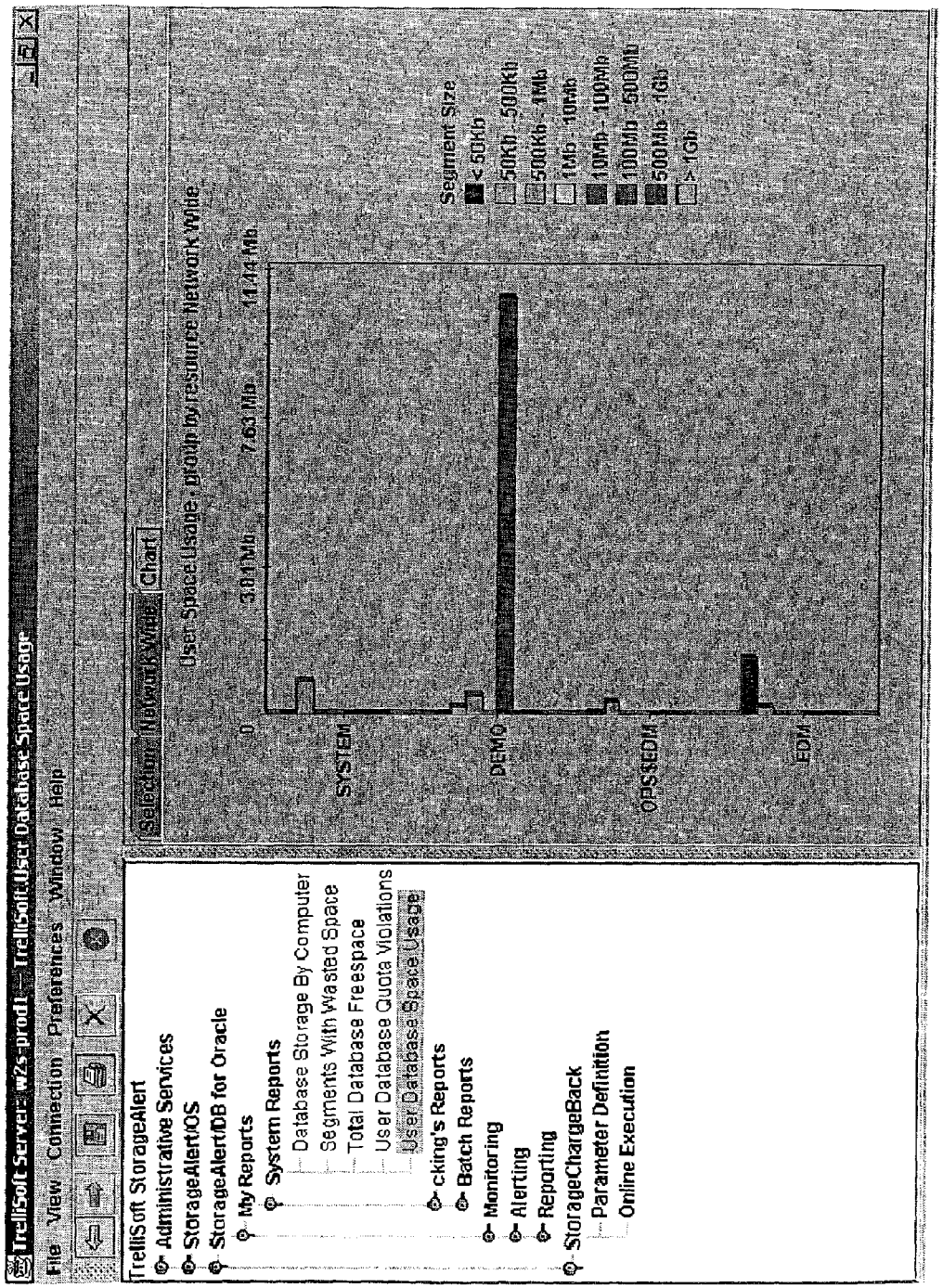

Typically, report generator 76 is capable of generating a number of pre-defined reports. FIG. 11B illustrates a graphical user interface that allows a user to select the objects of pre-defined reports. FIG. 11B illustrates tablespace selection for pre-defined capacity reporting and FIGS. 11C–11G illustrate various pre-defined capacity reports. Custom reports may further be defined by an end-user. FIGS. 11H–11M illustrate various end-user defined custom reports. Report definitions are again stored within server repository 55.

Pre-defined reports include standard reports that may be generated automatically for all computing device 40 of interest on network 20 that are being monitored. These pre-defined reports enable viewing storage enterprise data quickly and efficiently. Data used to generate these system reports is gathered during the last scan scheduled for each computer.

In addition, the scheduler of server data collector 75 may be capable of causing client computing device 30 to execute batch reports on a regularly-scheduled basis, preparing groups of reports as defined by a user through the GUI at device 30. The scheduler simply dispatches a message to the client computing device 30, causing client computing device 30 to generate the scheduled report. Data collector 75 may thus easily process scheduled reports in the much the same way as scheduled queries. That is, at pre-defined intervals a message requesting a report may be dispatched to a known client computing device 30.

Data collector 75 and client interface 65 also dispatch alerts based on storage-related events that occur within the database environment. Events may be associated with individual probes or scans, or with reports that are generated.

Once events or conditions for which alerts are to be specified, the alerts can be triggered automatically through monitoring. A number of options for specifying the target of notification and how that notification is delivered are provided. The choice of which alert mechanism to use will most likely depend upon the severity of the event that triggers the alert. The available alert mechanisms include,

| Alert Mechanism: | Enables |
| --- | --- |
| SNMP Trap | Notification of alerts using SNMP. |
| Upon Log In to GUI | Receive a list of alerts that are targeted for a user every time the user logs in to the GUI. |
| EMAIL or Pager | Receive and email or page when a specific type of alert is triggered. This type of notification may be sent to defined e-mail addressing, including an administrator, and/or the violating user. This is very useful for high priority events such as running out of free space or imminent disk failure. |
| Windows or Unix Event log | Write out alert messages to the OS log (Windows) or syslog (Unix). |
| Trigger Action Facility | Define an custom action, by way of script or the like, that should be performed automatically when a storage-related condition/event occurs within the ORACLE storage environment. |

Triggers may, for example be based on defined usage quotas input by way of a GUI at device 30. Use quotas may define limits on the amount of storage that a user or a group of users can consume at a network, Instance, or tablespace level. By providing an ability to define such quotas at different levels, one can control precisely how much storage a user can consume, not only on specific Instances, but on specific tablespaces and groups of tablespaces within an organization. The ability to specify these limits at any or all three different levels is provided. A quota is checked by aggregating the storage usage statistics stored in the collection repository. Collected data stored at collection repository 60 and used to assess if usage quotas have been met or exceeded. Preferably, quotas are checked shortly after scans have been performed. This ensures that quotas are checked against the most recent storage usage data. Use quotas to define limits on the amount of storage that a user or group of users can consume at a network, instance or tablespace level. Tablespace defines a quota for a user or group of users at the tablespace level. Instance defines a quota that places limits on a specific Instance for a user or group of users. This means that the quota for a user or group of users will be monitored on each computer and Instance included in the quota.

Network level limits may further define a quota that place limits over multiple machines and tablespaces. Network level limits maybe placed on users or groups of users for all the computers (or a chosen subset) or tablespaces in an environment enabling the definition of quotas that affect multiple machines on a network. Instance alerts may be triggered when certain conditions are detected on an Instance during a probe. An Instance alert may be triggered when a new tablespace is discovered or when an archive log directory consumes more than a specified amount of storage space. Controlling trigger actions for instance alerts is similar to quotas.

Tablespace alerts allow users to be notified when certain conditions are detected on a tablespace during a second type of query job. The following conditions for triggering a tablespace alert may be specified: when the free space on a tablespace is less than a specified amount, when the free space on a tablespace is fragmented into a specified number of extents, when the largest free extent contains less than the specified amount of storage space, when a tablespace goes offline and when a tablespace is dropped. Controlling trigger actions for tablespace alerts is similar to quotas just described.

Table alerts allow users to be notified when certain conditions are detected on a table during a scan. The following example conditions for triggering a table alert may be specified; when the maximum extents minus the allocated extents for a table is less than a specified number of extents, when a segment has more than a specified number of extents, when a table has a chained row count greater than a specified percent, when the empty used space within a table segment exceeds a specified amount, when the total size of a table is greater than a specified amount, and when a table is dropped.

As will be appreciated, these triggered alerts may thus be chosen by a administrator to be indicative of a level of disorganization for the database.

A Triggered Action Facility allows definition of thresholds and constraints that result in notification or action. The Triggered Action Facility is script-based, allowing use of any third-party tools for actions, such as archiving, back-up and recovery, or provisioning. Scripts may be stored on the server 50 and optionally within agent repository 44 of each computing device 40. There are two main reasons to run a script; in response to an alert and for batch reports.

When a script is run, server 50 looks in its local scripts directory. If server 50 can resolve the script name, it loads that script and sends it to the agent 41 designated to run the script. The agent 41 receives the script, names it as temporary file, and runs it. After the agent 41 has finished running the script, the temporary file is deleted.

If the script already exists in the agent's scripts directory, the agent 44 will ignore the script sent by the server 50 and just run its local version. If the agent may not run scripts sent by the server, the agent will ignore the script sent by the server. The advantage of allowing an agent 41 to run scripts is that only one copy of the script is stored in the servers script directory and there is no need to have to keep a copy of the script on every agent machine. For example, if a tablespace's free space went below a certain threshold, a script may be run based on that threshold on the machine where the tablespace exists. For this example, a particular agent would not be the target on which to run the script, but instead the script should run on the computer that has the tablespace low freespace condition. If the agent may not run scripts sent by server 50 then care must be taken to ensure that the appropriate script is stored on every single agent. However, if the agent may run scripts sent by server 50, then the server 50 will provide the script to the agent that has the low freespace condition. The script will then run on whatever agent 41 is associated with a database having the low freespace condition.

Script parameters provide specific information on the alert that triggered the script to be run. The parameters passed to a script depend on the type of alert that was triggered. The following table describes available script parameters:

| Script Parameter | Description |
| --- | --- |
| <available-extents> | The number of extents still available to the segment for growth. This value equals the maximum extents available to the object minus the extents currently allocated to the segment. |
| <computer> | Computer name where the triggering condition occurred. |
| <database> | The name of the ORACLE database where the triggering condition occurred. |
| <extent-count> | The number of extents allocated to a segment, or the number of free extents in the tablespace (depends on Alert type). |
| <percent-of-capacity> | % Percentage of capacity of the tablespace. |
| <rdbms-instance-name> | ORACLE SID |
| <segment> | The name of the table segment that has triggered the alert. |
| <segment-type> | The type of segment that has triggered the alert. The possible types of segments include: TABLE TABLE PARTITION TABLE SUBPARTITION NESTED TABLE CLUSTER INDEX INDEX PARTITION INDEX SUBPARTITION LOBINDEX LOBSEGMENT LOB PARTITION LOB SUBPARTITION |
| <table> | The name of the table that triggered the alert condition. |
| <tablespace> | The name of the tablespace that triggered the alert condition |
| <threshold> | Value set for the triggering condition. If the value unit was specified as a %, then a % will follow this value. |
| <threshold><thr-designator> | Value of the triggering condition, in KB, MB, or GB, or % (value units). |
| <usage><size-designator> | Value of used disk space, in KB, MB, or GB. |
| <archive-log-directory> | Name of the archive log directory that has triggered the archive log directory Instance alert. |
| <archive-file-count> | The number of log files residing in the archived log directory. |
| <totaled-file-size> <size designator> | Total amount of storage consumed by the archive log directory, measured in KB, MB, or GB. |

-continued

| Script Parameter | Description |
|---|---|
| <free-space><size designator> | Total amount of freespace available in the tablespace, measured in KB, MB, or GB. |
| <largest-extent-size | Total amount of the largest free extent in the tablespace, measured in KB, MB, or GB. |
| <chained-row-count> | The number of chained rows in a table that has triggered the Chained Row table alert. |
| <percent-of-total-rows>% | The percentage of table rows that are chained. |
| <percent-of-table-size> | The percentage of space allocated to a segment that is empty and unused (i.e., the percentage of space above the high-water mark). Available on the Empty Used Segment Space table alert. |

The above example reports and alerts are based on reports and alerts defined in an application made available by Trellisoft under the trademark StorageAlert/DB and incorporating aspects of the present invention. This software and further example alerts, reports, probes and scans that may be performed using software exemplary of embodiments of the present invention are detailed in Trellisoft StorageAler/DB User Guide Version 1.1 and Trellisoft StorageAlert/DB Quick Reference, attached as Appendix "A" and "B", hereto, and hereby incorporated by reference herein.

Of course, the above described embodiments, are intended to be illustrative only and in no way limiting. The described embodiments of carrying out the invention, are susceptible to many modifications of form, arrangement of parts, details and order of operation. The described software, for example, has been described to include defined functional blocks, using specific platforms to interact with specific applications. The invention may, however, be embodied in any number of ways by a person of ordinary skill. The invention, rather, is intended to encompass all such modification within its scope, as defined by the claims.

What is claimed is:

1. At a server on a data network, a method of collecting data representative of storage utilizations by applications executing at several computing devices across said data network, the method comprising:
   (a) dispatching query requests from said server, to each of said several computing devices, at least one query request indicative of storage utilization information requested from an application at said each of said several computing devices;
   (b) receiving responses from said computing devices, at least one of said responses including requested storage utilization information provided by an application at said each of said several computing devices;
   (c) storing said requested utilization data at said server for processing.

2. The method of claim 1, wherein said query requests include information to be received by agent applications at said several computing devices, said agent applications adapting an associated one of said several computing device to query said application at said each of said several computing devices to obtain said requested utilization information.

3. The method of claim 1, wherein at least one of said applications comprises a database engine.

4. The method of claim 3, wherein said at least one query request to said database engine comprises an identifier of tables stored by said database engine at a server executing said database engine, to obtain an indicator of usage by said tables.

5. The method of claim 3, wherein said responses from said database engine provide a mapping of storage resources used by a database managed by said database engine, and files stored in a files system at a computing hosting said database engine.

6. The method of claim 3, wherein said at least one query requests to said database engine comprises an identifier of a database user to obtain an indicator of usage by said user at a server executing said database engine.

7. The method of claim 1, further comprising dispatching an alert in response to detecting a defined condition at one of said computing devices, based on requested utilization information from said computing device.

8. The method of claim 7, wherein said defined condition comprises a storage quota.

9. The method of claim 8, wherein said storage quota defines a maximum storage space used by one of a user, a table or a computing device.

10. The method of claim 1, further comprising generating a report detailing storage utilization by said applications, based said requested utilization data stored at said server.

11. The method of claim 1, wherein the server dispatches a query in response to a query command from a client connected to the server through the network.

12. A method of collecting data representative of storage utilization by an application at a computing device, comprising:
   (a) receiving from a message indicative of a query and specific storage utilization data to be collected from a server in communication with said computing by way of a data network;
   (b) querying said application to obtain said specific storage utilization data;
   (c) providing said storage utilization data to said server.

13. The method of claim 12, wherein said application comprises a database engine, and wherein said querying comprises executing a query command using said database engine to obtain said specific storage utilization data.

14. The method of claim 12, further comprises using an application programmer interface to obtain said specific storage utilization data.

15. The method of claim 12, wherein said application comprises a database engine, and wherein said message is indicative of a table stored within a table maintained by said database engine.

16. The method of claim 12, wherein said application comprises a database engine, and wherein said message is indicative of a request for data providing an oversight of resources used by said application by said database engine.

17. Computer readable medium storing processor executable instructions that when loaded at a computing device comprising a processor adapts said computing device to perform the method of claim 1.

18. Computer readable medium storing processor executable instructions that when loaded at a computing device comprising a processor adapts said computing device to perform the method of claim 12.

19. A server on a data network, said server comprising a network interface, a processor in communication with computer readable memory storing processor executable instruction adapting said server to:
(a) dispatch query requests from said network interface, to each of several computing devices on said network, at least one query request indicative of storage utilization information requested from an application at said each of said several computing devices;
(b) receive responses from said computing devices, including requested storage utilization information from applications at said each of said computing devices;
(c) store said requested utilization information at said server for processing.

* * * * *